(12) United States Patent
Baek et al.

(10) Patent No.: US 11,778,679 B2
(45) Date of Patent: Oct. 3, 2023

(54) DEVICE AND METHOD FOR TRANSMITTING STATE INFORMATION IN WIRELESS COMMUNICATION SYSTEM

(71) Applicant: Samsung Electronics Co., Ltd., Suwon-si (KR)

(72) Inventors: Sangkyu Baek, Suwon-si (KR); Hyunjeong Kang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 16/789,631

(22) Filed: Feb. 13, 2020

(65) Prior Publication Data
US 2020/0267794 A1    Aug. 20, 2020

(30) Foreign Application Priority Data

Feb. 14, 2019  (KR) .................. 10-2019-0017444
Mar. 28, 2019  (KR) .................. 10-2019-0035854
Dec. 24, 2019  (KR) .................. 10-2019-0174454

(51) Int. Cl.
*H04W 76/19* (2018.01)
*H04W 76/15* (2018.01)
(Continued)

(52) U.S. Cl.
CPC .......... *H04W 76/19* (2018.02); *H04W 76/15* (2018.02); *H04W 76/27* (2018.02);
(Continued)

(58) Field of Classification Search
CPC . H04W 76/19; H04W 36/0027; H04W 36/18; H04W 36/305; H04W 76/15; H04W 76/27
See application file for complete search history.

(56) References Cited

U.S. PATENT DOCUMENTS

2016/0212753 A1*  7/2016  Wu ................... H04L 5/0032
2017/0013565 A1*  1/2017  Pelletier ............. H04W 52/367
(Continued)

FOREIGN PATENT DOCUMENTS

KR   10-2018-0136862 A   12/2018
KR   10-2019-0143733 A   12/2019
(Continued)

OTHER PUBLICATIONS

Qualcomm Inc Seeks Patent for 2 Enbsenb S-RLF Procedures for Managing Secondary eNB SeNB Radio Link Failure S-RLF in Dual Connectivity Scenarios, Global IP news (Year: 2018).*

(Continued)

*Primary Examiner* — Oussama Roudani

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to various embodiments of the present disclosure, a method for operating a user equipment (UE) supporting carrier aggregation (CA) with a master cell group (MCG) and a secondary cell group (SCG) in a wireless communication system is provided. The method comprising: detecting a radio link failure (RLF) of the MCG; when the RLF of the MCG is detected, determining whether a transmission to the SCG is suspended; and when the transmission to the SCG is determined to be suspended, initiating a connection re-establishment procedure.

6 Claims, 40 Drawing Sheets

(51) Int. Cl.
*H04W 76/27* (2018.01)
*H04W 36/30* (2009.01)
*H04W 36/00* (2009.01)
*H04W 36/18* (2009.01)

(52) U.S. Cl.
CPC ........ *H04W 36/0027* (2013.01); *H04W 36/18* (2013.01); *H04W 36/305* (2018.08)

(56) References Cited

U.S. PATENT DOCUMENTS

| | | | |
|---|---|---|---|
| 2017/0127331 A1* | 5/2017 | Wu | H04W 76/27 |
| 2018/0035483 A1 | 2/2018 | Nagasaka et al. | |
| 2018/0184362 A1* | 6/2018 | Babaei | H04W 48/12 |
| 2018/0220326 A1 | 8/2018 | Nagasaka et al. | |
| 2018/0278357 A1* | 9/2018 | Kim | H04J 11/0083 |
| 2019/0037635 A1* | 1/2019 | Guo | H04W 76/27 |
| 2019/0045568 A1 | 2/2019 | Palat et al. | |
| 2019/0090144 A1* | 3/2019 | Wu | H04W 76/19 |
| 2019/0141557 A1* | 5/2019 | da Silva | H04B 17/30 |
| 2019/0327634 A1* | 10/2019 | Lee | H04W 24/10 |
| 2019/0373663 A1* | 12/2019 | Yu | H04W 92/10 |
| 2019/0393989 A1 | 12/2019 | Jung et al. | |
| 2020/0045764 A1* | 2/2020 | Kim | H04W 36/305 |
| 2020/0053826 A1* | 2/2020 | Shi | H04W 76/19 |
| 2020/0059395 A1* | 2/2020 | Chen | H04W 76/27 |
| 2020/0084806 A1* | 3/2020 | Orsino | H04W 74/0833 |
| 2020/0107390 A1 | 4/2020 | Hwang et al. | |
| 2020/0351968 A1* | 11/2020 | Yilmaz | H04W 76/25 |
| 2021/0112617 A1* | 4/2021 | Zhang | H04W 76/15 |
| 2022/0014985 A1* | 1/2022 | Da Silva | H04W 76/27 |

FOREIGN PATENT DOCUMENTS

| | | |
|---|---|---|
| RU | 2661538 C1 | 7/2018 |
| WO | 2018/128572 A1 | 7/2018 |
| WO | 2018171577 A1 | 9/2018 |
| WO | 2018182231 A1 | 10/2018 |
| WO | 2019028747 A1 | 2/2019 |

OTHER PUBLICATIONS

Dual Connectivity in LTE small cell networks, Jha et al., IEEE Xplorer (Year: 2014).*
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0 (Sep. 2018), 918 pages.
International Search Report dated May 26, 2020 in connection with International Patent Application No. PCT/KR2020/001828, 3 pages.
Written Opinion of the International Searching Authority dated May 26, 2020 in connection with International Patent Application No. PCT/KR2020/001828, 4 pages.
Official Action dated Jan. 31, 2022, in connection with Russian Application No. 2021121591/07(045135), 14 pages.
Supplementary European Search Report dated Mar. 9, 2022, in connection with European Application No. 20755352.0, 11 pages.
Examination report dated Mar. 17, 2022, in connection with Indian Application No. 202117041118, 5 pages.
3GPP TS 37.340 V15.4.0 (Dec. 2018), Technical Specification, 3rd Generation Partnership Project; Technical Specification Group Radio Access Network; Evolved Universal Terrestrial Radio Access (E-UTRA) and NR; Multi-connectivity; Stage 2 (Release 15), Dec. 2018, 67 pages.
3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15), Dec. 2018, 474 pages.
Decision to Grant dated May 17, 2022, in connection with Russian Application No. 2021121591/07(045135), 14 pages.

* cited by examiner

DEVICE AND METHOD FOR TRANSMITTING STATE INFORMATION IN WIRELESS COMMUNICATION SYSTEM

CROSS-REFERENCE TO RELATED APPLICATIONS

This application is based on and claims priority under 35 U.S.C. 119 to Korean Patent Application Nos. 10-2019-0017444, 10-2019-0035854 & 10-2019-0174454 filed on Feb. 14, 2019, Mar. 28, 2019 & Dec. 24, 2019, respectively, in the Korean Intellectual Property Office, the disclosure of which is herein incorporated by reference in their entireties.

BACKGROUND

1. Field

This disclosure relates generally to a wireless communication system and, more particularly, to a device and method for transmitting state information in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. In the wireless communication system, a terminal may detect a specific state and may transmit a message for reporting state information. Such state information may include a wireless connection state or a quality state such as quality of service (QoS). The state information may be received by a base station or another terminal, and may be processed in order to improve the state.

The above information is presented as background information only to assist with an understanding of the disclosure. No determination has been made, and no assertion is made, as to whether any of the above might be applicable as prior art with regard to the disclosure.

SUMMARY

Based on the above discussion, this disclosure provides an apparatus and method for transmitting state information in a wireless communication system.

In addition, this disclosure provides an apparatus and method for transmitting a report of a master cell group (MCG) radio link failure (RLF) when the MCG RLF occurs in a wireless communication system.

In addition, this disclosure provides an apparatus and method for satisfying a quality of service (QoS) requirement in vehicle-to-everything (V2X) communication in a wireless communication system.

According to various embodiments of the present disclosure, a method for operating a user equipment (UE) supporting carrier aggregation (CA) with a master cell group (MCG) and a secondary cell group (SCG) in a wireless communication system is provided. The method comprises: detecting a radio link failure (RLF) of the MCG; when the RLF of the MCG is detected, determining whether a transmission to the SCG is suspended; and when the transmission to the SCG is determined to be suspended, initiating a connection re-establishment procedure.

According to various embodiments of the present disclosure, a user equipment (UE) supporting carrier aggregation (CA) with a master cell group (MCG) and a secondary cell group (SCG) in a wireless communication system is provided. The UE comprises: a transceiver; and at least one processor operably coupled to the transceiver, and configured to: detect a radio link failure (RLF) of the MCG; when the RLF of the MCG is detected, determine whether a transmission to the SCG is suspended; and when the transmission to the SCG is determined to be suspended, initiate a connection re-establishment procedure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 40, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and are not intended to limit the disclosure. A singular expression may include a plural expression unless they are definitely different n a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

This disclosure described below relates to a device and method for transmitting state information in a wireless communication system. Specifically, this disclosure describes a technique for transmitting a report message of an MCG RLF and a QoS requirement dissatisfaction report message in a wireless communication system.

As used below, the term referring to a signal, the term referring to a channel, the term referring to control information, the terms referring to network entities, the terms referring to elements of a device, and the like are provided by way of example for the convenience of description. Accordingly, the disclosure is not limited to the following terms and other terms having the same technical meaning may be used.

In addition, the disclosure describes various embodiments using terms used in some communication standards (e.g., 3rd Generation Partnership Project (3GPP)), but this is merely an example for description. Various embodiments may be easily modified and applied in other communication systems.

Figure 1:
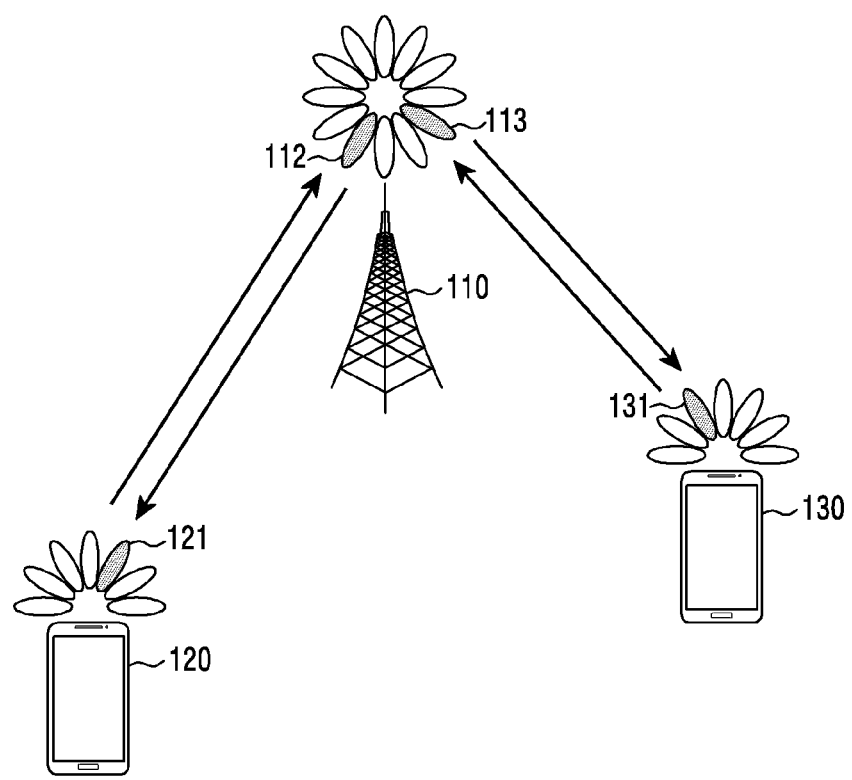
FIG. 1 illustrates a wireless communication system according to various embodiments.

FIG. 1 illustrates a wireless communication system according to various embodiments. FIG. 1 exemplifies a base station 110, a terminal 120, and a terminal 130 as some of nodes using a wireless channel in a wireless communication system. Although FIG. 1 illustrates only one base station, another base station identical or similar to the base station 110 may be further included.

The base station 110 is a network infrastructure that provides wireless connectivity to the terminals 120 and 130. The base station 110 has a coverage defined as a predetermined geographic area based on the distance over which a signal can be transmitted. The base station 110 may be referred to as an "access point (AP)", an "eNodeB (eNB)", a "5th generation node (5G node)", a "wireless point", a "transmission/reception point (TRP)" or another term having an equivalent technical meaning, in addition to the term "base station".

Each of the terminals 120 and terminal 130 is a device used by a user and communicates with the base station 110 via a wireless channel. In some cases, at least one of the terminal 120 and the terminal 130 may be operated without user involvement. That is, at least one of the terminal 120 and the terminal 130 may be a device for performing machine type communication (MTC) and may not be carried by the user. Each of the terminal 120 and the terminal 130 may be referred to as a "user equipment (UE)", a "mobile station", a "subscriber station", and a "remote terminal", a "wireless terminal", or a "user device" or another term having an equivalent technical meaning, in addition to the term "terminal".

The base station 110, the terminal 120, and the terminal 130 may transmit and receive a radio signal in a millimeter wave (mmWave) band (e.g., 28 GHz, 30 GHz, 38 GHz, or 60 GHz). In this case, in order to improve a channel gain, the base station 110, the terminal 120, and the terminal 130 may perform beamforming. Here, the beamforming may include transmission beamforming and reception beamforming. That is, the base station 110, the terminal 120, and the terminal 130 may impart directivity to a transmission signal or a reception signal. For this purpose, the base station 110 and the terminals 120 and 130 may select serving beams 112, 113, 121, and 131 through a beam search or beam management procedure. After the serving beams 112, 113, 121, and 131 are selected, subsequent communication may be performed via a resource in a quasi-co-located (QCL) relationship with a resource that transmitted the serving beams 112, 113, 121, and 131.

Figure 2:
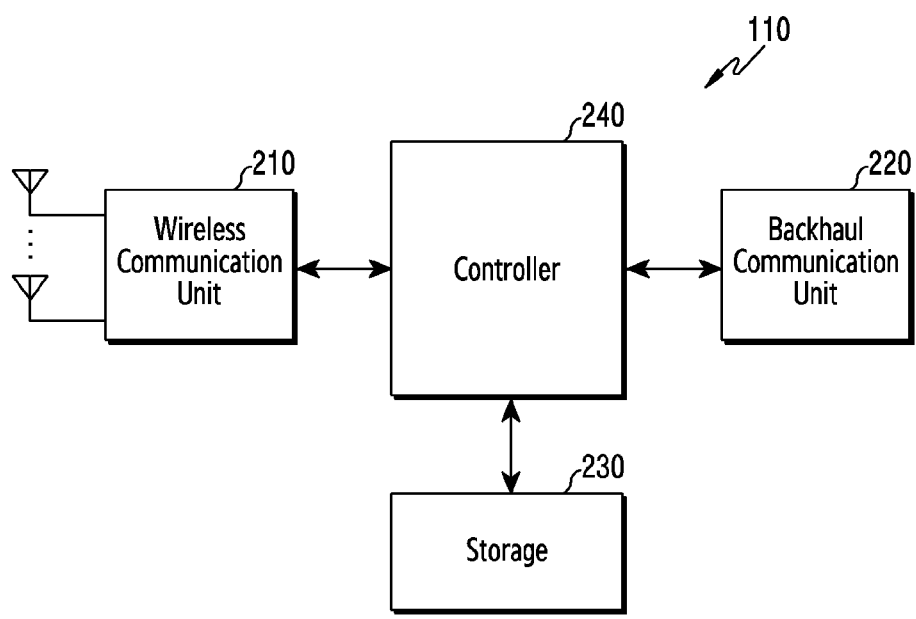
FIG. 2 illustrates the configuration of a base station in a wireless communication system according various embodiments.

FIG. 2 illustrates the configuration of a base station in a wireless communication system according various embodiments. The configuration exemplified in FIG. 2 may be understood as the configuration of the base station 110. Terms such as "-part" and "-unit" to be used below means a unit for processing at least one function or operation, and may be implemented by hardware, software, or a combination of hardware and software.

Referring to FIG. 2, the base station includes a wireless communication unit 210, a backhaul communication unit 220, a storage 230, and a controller 240.

The wireless communication unit 210 may perform functions for transmitting/receiving signals via a wireless channel. For example, the wireless communication unit 210 may perform a conversion function between a baseband signal and a bit stream according to a physical layer specification of a system. For example, during data transmission, the wireless communication unit 210 may generate complex symbols by encoding and modulating a transmission bit stream. In addition, during data reception, the wireless communication unit 210 may recover a reception bit stream through demodulation and decoding of the baseband signal.

In addition, the wireless communication unit 210 up-converts a baseband signal to a radio frequency (RF) band signal and then transmits the RF band signal via an antenna. In addition, the wireless communication unit 210 down-converts air RF band signal received via the antenna to a baseband signal. For this purpose, the wireless communication unit 210 may include a transmission filter, a reception filter, an amplifier, a mixer, an oscillator, a digital to analog converter (DAC), an analog to digital converter (ADC), and the like. In addition, the wireless communication unit 210 may include multiple transmission/reception paths. Furthermore, the wireless communication unit 210 may include at least one antenna array composed of a plurality of antenna elements.

In terms of hardware, the wireless communication unit 210 may be composed of a digital unit and an analog unit, and the analog unit may include a plurality of sub-units depending on operating power, operating frequency, or the like. The digital unit may be implemented with at least one processor (e.g., a digital signal processor (DSP)).

As described above, the wireless communication unit 210 transmits/receives signals. Accordingly, all or a part of the wireless communication unit 210 may be referred to as a "transmitter", a "receiver", or a "transceiver". In the following description, the transmission and reception performed via wireless channels are used in a meaning including the case in which the above-described processing is performed by the wireless communication unit 210.

The backhaul communication unit 220 provides an interface for communicating with other nodes in the network. That is, the backhaul communication unit 220 converts a bit stream transmitted from the base station to another node, for example, another access node, another base station, an upper node, a core network, etc. into a physical signal, and converts a physical signal received from another node into a bit stream.

The storage 230 stores data such as a basic program, an application, and setting information for operation of the base station. The storage 230 may be configured as volatile memory, nonvolatile memory, or a combination of volatile memory and nonvolatile memory. In addition, the storage 230 may provide the data stored therein in response to the request of the controller 240.

The controller 240 controls the overall operations of the base station. For example, the controller 240 transmits and receives a signal via the wireless communication unit 210 or via the backhaul communication unit 220. In addition, the controller 240 records and reads data in the storage 230. The controller 240 may perform functions of a protocol stack required by a communication standard. According to another embodiment, the protocol stack may be included in the wireless communication unit 210. For this purpose, the controller 240 may include at least one processor.

According to various embodiments, the controller 240 may receive state information, and may control operations for processing the received information. For example, the controller 240 may control the base station to perform operations according to various embodiments to be described later.

Figure 3:
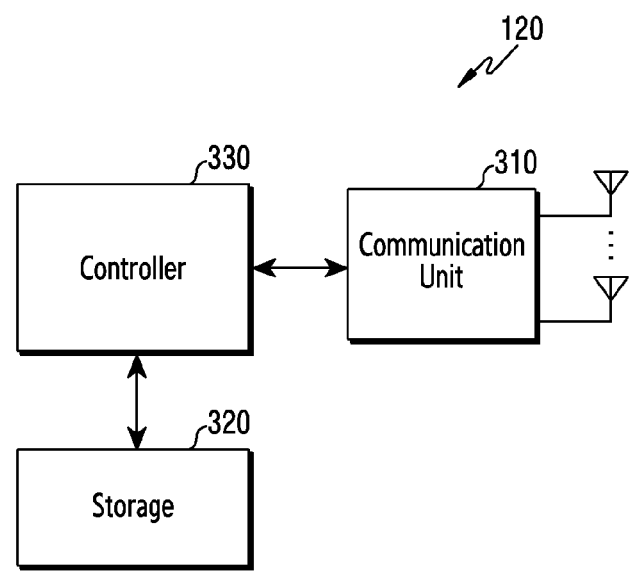
FIG. 3 illustrates the configuration of a terminal in a wireless communication system according various embodiments.

FIG. 3 illustrates the configuration of a terminal in a wireless communication system according various embodiments. The configuration exemplified in FIG. 3 may be understood as the configuration of the terminal 120. Terms such as "-part" and "-unit" to be used below means a unit for processing at least one function or operation, and may be implemented by hardware, software, or a combination of hardware and software.

Referring to FIG. 3, the terminal includes a communication unit 310, a storage 320, and a controller 330.

The communication unit 310 may perform functions for transmitting/receiving a signal via a wireless channel. For example, the communication unit 310 may perform a conversion function between a baseband signal and a bit stream according to a physical layer specification of a system. For example, during data transmission, the communication unit 310 may generate complex symbols by encoding and modulating a transmission bit stream. In addition, during data reception, the communication unit 310 may recover a reception bit stream through demodulation and decoding of the baseband signal. In addition, the communication unit 310 up-converts a baseband signal to a radio frequency (RF) band signal and then transmits the RF band signal via an antenna. In addition, the wireless communication unit 210 down-converts an RF band signal received via the antenna to a baseband signal. For example, the communication unit 310 may include a transmission filter, a reception filter, an amplifier, a mixer, an oscillator, a DAC, an ADC, and the like.

In addition, the communication unit 310 may include multiple transmission/reception paths. Furthermore, the communication unit 310 may include at least one antenna array composed of a plurality of antenna elements. In terms of hardware, the communication unit 310 may be configured as a digital circuit and an analog circuit (e.g., a radio frequency integrated circuit (RFIC)). Here, the digital circuit and the analog circuit may be implemented as a single package. In addition, the communication unit 310 may include a plurality of RF chains. Furthermore, the communication unit 310 may perform beamforming.

The communication unit 310 transmits/receives signals as described above. Accordingly, all or a part of the communication unit 310 may be referred to as a "transmitter", a "receiver", or a "transceiver". In the following description, the transmission and reception performed via wireless channels are used in a meaning including the case in which the processing as described above is performed by the communication unit 310.

The storage 320 stores data such as a basic program, an application, and setting information for operation of the terminal. The storage 320 may be configured as volatile memory, nonvolatile memory, or a combination of volatile memory and nonvolatile memory. In addition, the storage 320 may provide the data stored therein in response to the request of the controller 330.

The controller 330 controls the overall operations of the terminal. For example, the controller 330 may transmit and receive signals via the communication unit 310. In addition, the controller 330 records and reads data in the storage 320. The controller 330 may perform functions of a protocol stack required by a communication standard. To this end, the controller 330 may include at least one processor or a microprocessor, or may be a part of a processor. In addition, a part of the communication unit 310 and the controller 330 may be referred to as a communication processor (CP).

According to various embodiments, the controller 330 may transmit state information or receive state information, and may control operations for processing the received information. For example, the controller 330 may control the terminal to perform operations according to various embodiments to be described later.

Figure 4:
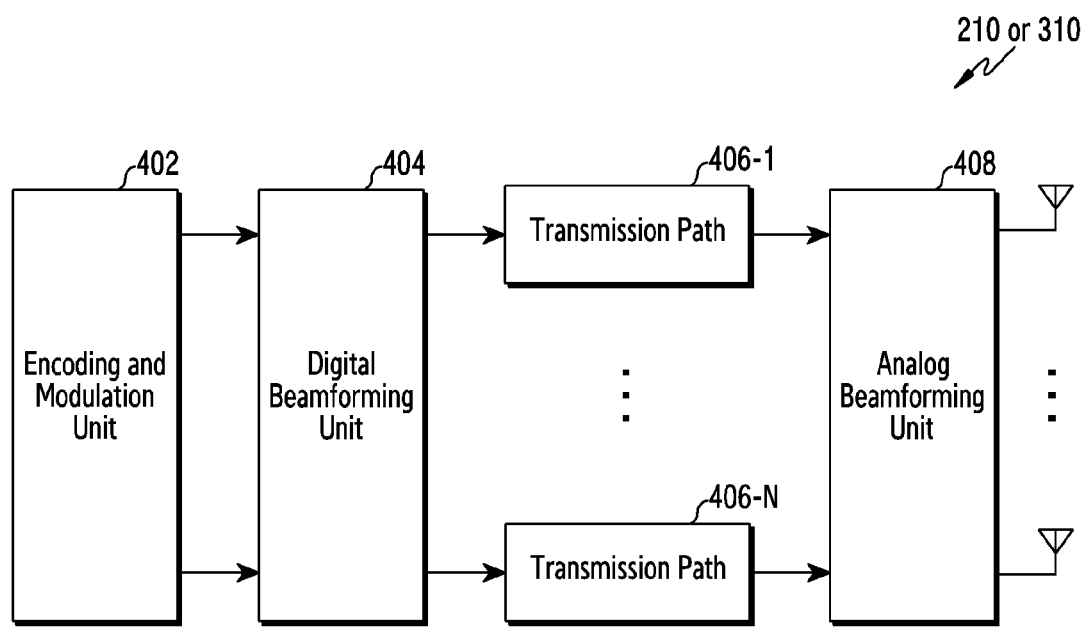
FIG. 4 illustrates the configuration of a communication unit in a wireless communication system according various embodiments.

FIG. 4 illustrates the configuration of a communication unit in a wireless communication system according various embodiments. FIG. 4 illustrates an example of a detailed configuration of the wireless communication unit 210 of FIG. 2 or the communication unit 310 of FIG. 3. Specifically, FIG. 4 exemplifies components for performing beamforming as a part of the wireless communication unit 210 of FIG. 2 or the communication unit 310 of FIG. 3.

Referring to FIG. 4, the wireless communication unit 210 or the communication unit 310 includes an encoding and modulation unit 402, a digital beamforming unit 404, multiple transmission paths 406-1 to 406-N, and an analog beamforming unit 408.

The encoding and modulation unit 402 performs channel encoding. For channel encoding, at least one of a low density parity check (LDPC) code, a convolution code, and a polar code may be used. The encoding and modulation unit 402 generates modulation symbols by performing constellation mapping.

The digital beamforming unit 404 performs beamforming on digital signals (e.g., modulation symbols). For this purpose, the digital beamforming unit 404 multiplies the modulation symbols by beamforming weights. Here, the beamforming weights are used to change the magnitudes and phases of signals, and may be referred to as a "preceding matrix", a "precoder", or the like. The digital beamforming unit 404 outputs digital-beamformed modulation symbols to the multiple transmission paths 406-1 to 406-N. In this case, according to a multiple input multiple output (MIMO) transmission scheme, the modulation symbols may be multiplexed, or the same modulation symbols may be provided to the multiple transmission paths 406-1 to 406-N.

The multiple transmission paths 406-1 to 406-N convert digital-beamformed digital signals into analog signals. For this purpose, each of the multiple transmission paths 406-1 to 406-N may include an inverse fast Fourier transform (IFFT) calculator, a cyclic prefix (CP) inserter, a DAC, and an up-converter. The CP inserter is for an orthogonal frequency division multiplexing (OFDM) scheme, and may be excluded when another physical layer scheme (e.g., a filter bank multi-carrier (FBMC)) is applied. That is, the multiple transmission paths 406-1 to 406-N0 provide independent signal processing processes for multiple streams generated through digital beamforming. However, depending on the implementation scheme, some of the components of the multiple transmission paths 406-1 to 406-N may be used in common.

The analog beamforming unit 408 performs beamforming on analog signals. For this purpose, the digital beamforming unit 404 multiplies analog signals by beamforming weights. Here, beamforming weights are used to change the magnitudes and phases of signals. Specifically, the analog beamforming unit 408 may be variously configured depending on a connection stricture between the multiple transmission paths 406-1 to 406-N and antennas. For example, each of the plurality of transmission paths 406-1 to 406-N may be connected to one antenna array. As another example, the multiple transmission paths 406-1 to 406-N may be connected to one antenna array. As another example, the multiple transmission paths 406-1 to 406-N may be adaptively connected to one antenna array or may be connected to two or more antenna arrays.

Figure 5:
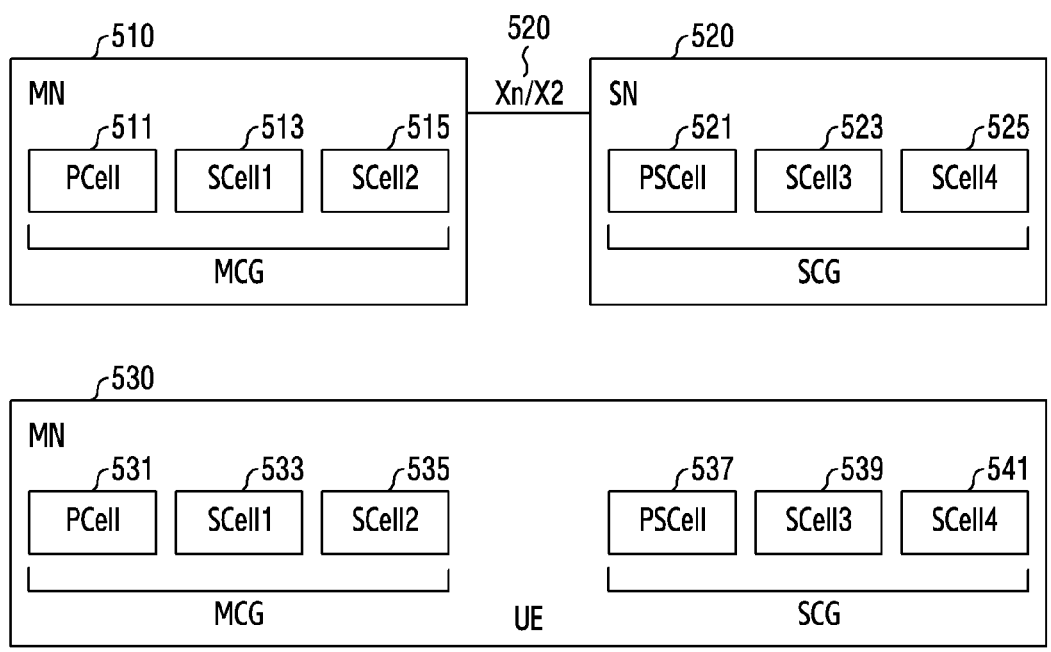
FIG. 5 illustrates a dual connectivity structure of a configuration of a base station and a terminal in a wireless communication system according various embodiments.

FIG. 5 illustrates a dual connectivity structure of a configuration of a base station and a terminal in a wireless communication system according various embodiments.

Referring to FIG. 5, in a dual connectivity structure, two base station nodes 510 and 520 may perform functions of a base station (e.g., the base station 110), and the base station nodes 510 and 520 may be connected to each other via an X2 interface and/or an Xn interface. In various embodiments, the base station node 510 that is primarily connected to a terminal 530 (e.g., the terminal 120 or the terminal 130) may be referred to as a master node (MN), and a base station node that is secondarily connected for the dual connectivity structure may be referred to as a secondary node (SN). The MN 510 may be an anchor point for signaling radio bearer 1 (SRB1) capable of instructing radio resource control (RRC) configuration of the terminal 530 and SRB2 capable of transmitting a non-access stratum) NAS message for configuring a connection between the terminal 530 and the core network. Each node may be connected to the terminal 530 via one or more cells so as to communicate with the terminal 530, and the one or more cells may include a primary cell (PCell) 511 that is essentially connected to a master node, a primary secondary cell (PSCell) 521 that is essentially connected to a secondary node, and at least one of secondary cells (SCells) 513, 515, 523, and 525 capable of being selectively used by each node. In various embodiments, cells managed by the master node may be included in a master cell group (MCG), and cells managed by the secondary node may be included in a secondary cell group (SCG). The terminal 530 may also communicate with the base station node 510 and/or the base station node 520 via the PCell 531, the PSCell 537, and/or at least one of additional SCells 533, 535, 539, and 541. In this case, the PCell 531, the PSCell 537, and the respective SCells 533, 535, 539, and 541 may be resources that are not physically different from but respectively correspond to the PCell 511, PSCell 521, and the respective SCells 513, 515, 523, and 525 having the same frequency band. Accordingly, the master cell group and the secondary cell group may be identically configured in the connection process between a base station and a terminal.

In such a dual connectivity structure, when the radio link situation of the secondary cell group is not good, and thus a radio link failure (RLF) of the secondary cell group, that is, an SCG RLF occurs, the terminal 530 may transmit a SCG failure information message to a master node (e.g., the base station node 510) via the master cell group. The SCG failure information message may be transmitted to SRB1, and the base station receiving the message may instruct to reconfigure or release the secondary cell group in which the SCG RLF has occurred. In this case, since the SCG RLF is a problem of the secondary cell group and may not affect the transmission performed via the master cell group, data transmitted to the master cell group may be continuously transmitted without interruption. This is because the SCG RLF is only a problem of the secondary cell group problem and may not affect the transmission performed in the master cell group. In addition, the SCG failure information message may be transmitted when the reconfiguration of the SCG failure occurs. In general, the SCG RLF and the reconfiguration failure may be collectively referred to as an SCG failure.

In contrast, when the RLF of the master cell group, that is, the MCG RLF occurs since the radio link situation of the master cell group is not good, the terminal 530 may not be able to transmit MCG failure information via the master cell group because the radio link state of the master cell group is not good. In this case, the terminal 530 and/or the base station node 510 may need to reconfigure the master cell group by performing an RRC connection reestablishment procedure. In the RRC connection reestablishment procedure, operations related to the RRC connection reestablishment procedure are performed depending on the radio link situation of the master cell group regardless of the state of connection of the secondary cell group. Therefore, an interruption may occur in which transmission of data transmitted to the secondary cell group as well as data transmitted to the master cell group is interrupted. However, when the secondary cell group is available, interruption of data transmission of the secondary cell group may not be necessarily needed. When the terminal 530 is able to transmit the report of the MCG RLF to the secondary cell group, the interruption due to the RRC connection reestablishment is capable of being prevented, and the interruption of data transmission of the secondary cell group is also capable of being prevented. In addition, an RRC connection reestablishment operation may be performed when RRC reconfiguration with handover or synchronization fails, in which case a method similar to MCG RLF reporting may be used. In general, these may be collectively referred to as an MCG failure.

Figure 6:
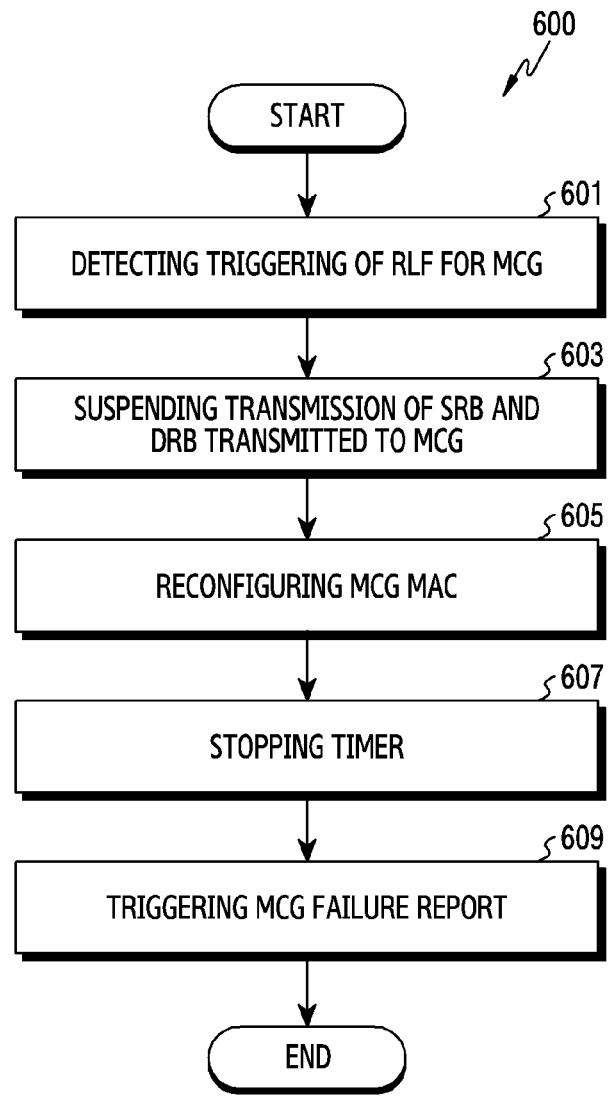
FIG. 6 illustrates a flowchart of a terminal when an MCG RLF occurs in a wireless communication system according various embodiments.

FIG. 6 illustrates a flowchart of a terminal when an MCG RLF occurs in a wireless communication system according to various embodiments. FIG. 6 exemplifies a method 600 of operating the terminal 530.

Referring to FIG. 6, in step 601, the terminal may detect triggering of the RLF for the MCG. In other words, the terminal may detect that the MCG RLF has been triggered. For example, the terminal may detect that the MCG RLF has been triggered for reasons such as expiration of T310 timer, a random access failure, and/or reaching the maximum number of retransmissions of RLC.

In step 603, the terminal may stop the transmission of an SRB and/or a data radio bearer (DRB) transmitted to the MCG. Since the terminal is not able to properly perform data transmission to the master cell group in the MCG RLF situation, the terminal may suspend the transmission of all SRBs and/or DRBs transmitted to the master cell group.

In step 605, the terminal may reconfigure (or reset) the MCG media access control (MAC). Since the terminal is not able to use the MAC of the master cell group when the MCG RLF is triggered, the terminal may reset the MAC of the master cell group.

In step 607, the terminal may stop the timer (e.g., the T304 timer). For example, in the case in which the T304 timer is running or another timer is running for handover, the terminal may stop the timers because the operations of the corresponding timers are no longer required. When there is no running timer, step 607 may be omitted.

In operation 609, the terminal may trigger an MCG failure report. For example, the terminal may trigger the MCG failure report so as to notifies the base station that the MCG RLF has occurred. In various embodiments, the notification may be indicated via the secondary cell group. A radio bearer used for MCG RLF reporting may include at least one of split SRB1, which may be used for transmission to the secondary cell group, or SRB3, which may be used for direct transmission to the secondary node.

Figure 7:
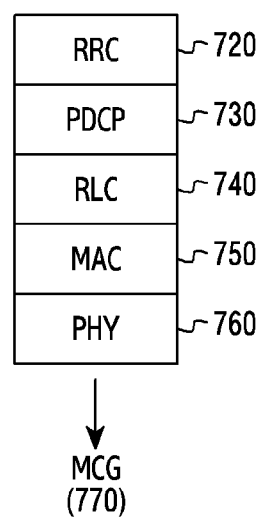
FIG. 7 illustrates a protocol structure of non-split SRB1 in a wireless communication system according various embodiments.

FIG. 7 illustrates a protocol structure of non-split SRB1 in a wireless communication system according various embodiments.

Referring to FIG. 7, non-split SRB1 710 may be configured to transmit an RRC message, and may be associated with an RRC 720, a packet data convergence protocol (PDCP) 730, a radio link control (RLC) 740, a media access control (MAC) 750, and a physical layer (PHY) 760 from the top. In various embodiments, the term "non-split" may mean that there is one RLC entity (e.g., RLC 740) for the corresponding radio bearer. In various embodiments, the RLC entity may be used interchangeably with an RLC bearer or a logical channel. The cell group used for non-split SRB1 710 may be a master cell group 770. In addition, the RRC of SRB1 may be associated with a master node, and the master node may manage the RRC connection of a terminal.

Figure 8:
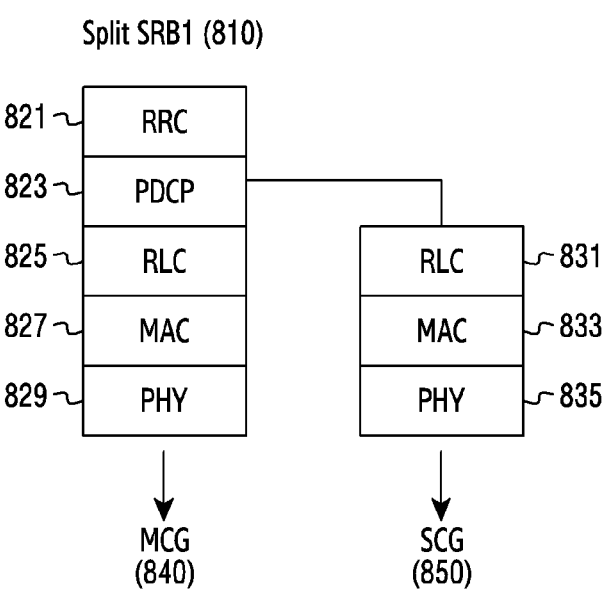
FIG. 8 illustrates a protocol structure of a split SRB1 in a wireless communication system according various embodiments.

FIG. 8 illustrates a protocol structure of split SRB1 in a wireless communication system according various embodiments.

Referring to FIG. 8, split SRB1 810 may be configured to transmit an RRC message, and may be associated with one layer of an RRC 821, one layer of PDCP 823 two or more layers of RLCs 825 and 831, two or more layers of MACs 827 and 833, and two or more layers of PHYs 829 and 835 from the top in various embodiments, the term "split" may mean that there are two or more RLC entities (e.g., RLCs 825 and 831) for the corresponding radio bearer. The cell groups used for split SRB1 may include one master cell group 840 and one secondary cell group 850. In addition, the RRC of split SRB1 may be associated with a master node, and the master node may manage the RRC connection of a terminal. The RLC entities 825 and 831 of split SRB1 may include a primary RLC (or a primary path) entity, which is used regardless of the amount of data to be transmitted, and a secondary RLC (or a secondary path) entity used when the data to be transmitted is equal to or greater than a threshold (e.g., ul-DataSplitThreshold). For example, a base station may inform a terminal of the threshold ul-DataSplitThreshold through RRC configuration. In addition, in the corresponding split SRB1, packet duplication may be performed for duplicating a packet in a PDCP entity of a transmitter and transmitting all data to multiple RLC entities. When packet duplication transmission is activated, the multiple RLC entities may be used for packet transmission at the same time.

Figure 9:
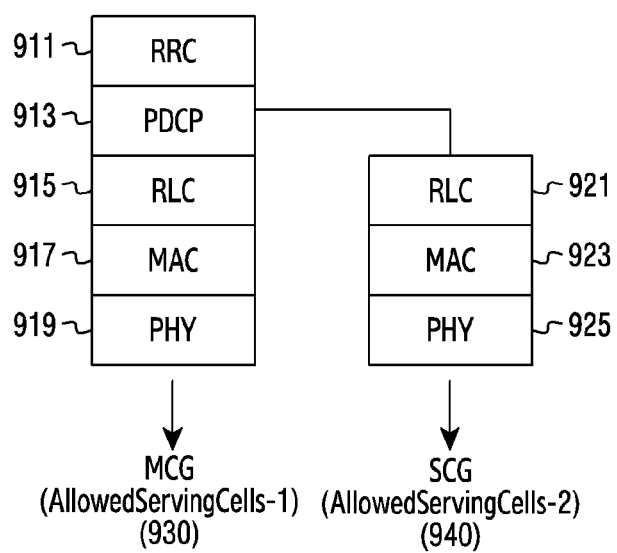
FIG. 9 illustrates a protocol structure of an SRB1 in which carrier aggregation (CA)-based packet duplication is configured.

FIG. 9 illustrates a protocol structure of an SRB1 in which carrier aggregation (CA)-based packet duplication is configured.

Split SRB1 910, in which CA-based duplication is configured, may be configured to transmit an RRC message, and may be associated with one layer of an RRC 911, one layer of a PDCP 913, two or more layers of RLCs 915 and 921, two or more layers of MACs 917 and 923, and two or more layers of PHYs 919 and 925 from the top. In SRB1 in which CA-based packet duplication is configured, packet duplication for duplicating a packet in a PDCP entity of a transmitter and transmitting all data to a plurality of RLC entities may be performed. When packet duplication transmission is activated, the multiple RLC entities may be used for packet transmission at the same time. When CA-based packet duplication is configured, there may be two or more RLC entities (e.g., RLC 915 and 921) for the corresponding radio bearer configured in the same cell group. All the cell groups used for SRB1 in which CA-based packet duplication is configured may be master cell groups 930 and 940. However, the list of cells available to each RLC entity (logical channel) may be configured differently. For example, in order to prevent packets generated in each RLC entity from being transmitted at the same time, a list of cells, which can be used by each RLC entity (logical channel), may be configured differently. In various embodiments, the list of cells, which can be used by each RLC entity (logical channel), may be referred to as "AllowedServingCell", and the AllowedServingCell may be configured for each RLC entity and/or each logical channel. The RRC of split SRB1, in which CA-based packet duplication is configured, may be associated with a master node, and the master node may manage the RRC connection of a terminal. In various embodiments, the RLC entities 915 and 921 of SRB1, in which CA-based packet duplication is configured, may include a primary RLC, which is used regardless of whether packet duplication is activated, and a secondary RLC entity, which is used when packet duplication is activated. The base station may inform the terminal of the configuration of the primary RLC and the secondary RLC through the RRC configuration.

Figure 10:
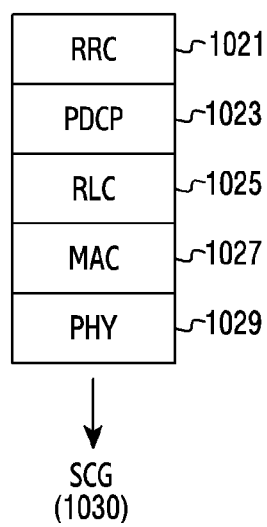
FIG. 10 illustrates a protocol structure of non-split SRB3.

FIG. 10 illustrates a protocol structure of non-split SRB3.

Referring to FIG. 10, non-split SRB3 1010 may be configured to transmit an RRC message, and may be associated with the layers of an RRC 1021, a PDCP 1023, an RLC 1025, an MAC 1027, and a PHY 1029 from the top. In various embodiments, the term "non-split" may mean that there is one RLC entity for the corresponding radio bearer. In various embodiments, the RLC entity may be used interchangeably with an RLC bearer or a logical channel. A cell group used for non-split SRB3 1010 may be a secondary cell group 1030. In addition, the RRC of SRB3 1010 may be associated with a secondary node, and the secondary node may manage some RRC connection of a terminal.

Figure 11:
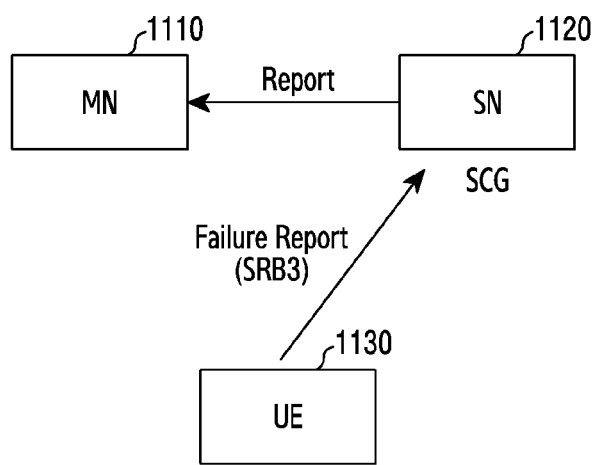
FIG. 11 illustrates an example of the case in which a terminal reports an MCG RLF to a base station when an MCG RLF has occurred, according to various embodiments.

FIG. 11 illustrates an example of the case in which a terminal reports an MCG RLF to a base station when the MCG RLF occurs according to various embodiments.

Referring to FIG. 11, when SRB3 is configured in the situation in which, since an MCG RLF has occurred, it is necessary for a terminal 1130 (e.g., the terminal 530) to forward information indicating that the MCG RLF has occurred (or information indicating that MCG RLF has been triggered, an MCG RLF report, an MCG failure information, or MCG RLF information) to a base station, the terminal 1130 may forward the MCG RLF information to a secondary node 1120 (e.g., the base station node 520) via SRB3. In various embodiments, a failure report message may be defined, and the failure report message may include at least one of information indicating that the MCG RLF has occurred, a reason why the MCG RLF has occurred, or measurement report information. When the terminal 1130 notifies the base station that the MCG RLF has occurred via SRB3, the cell group used may be a secondary cell group. However, since the anchor node of SRB3 is the secondary node 1120, the secondary node 1120 may be required to retransmit the MCG RLF information to a master node 1110 (e.g., the base station node 510) managing the MCG connection. In an embodiment, the content of the failure report message transmitted to SRB3 may be forwarded from the secondary node 1120 to the master node 1110 as it is. In another embodiment, the secondary node 1120 may process information on the terminal in the MCG RLF has occurred and the reason for the occurrence of the MCG RLF using another message, and may transmit the processed information to the master node 1110.

Figure 12:
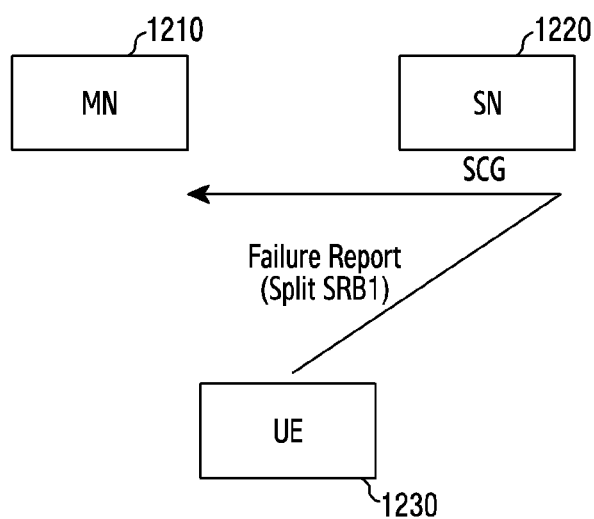
FIG. 12 illustrates an example of the case in which a terminal in which an MCG RLF has occurred reports information on the MCG RLF to a base station according to various embodiments.

FIG. 12 illustrates an example of the case in which a terminal in which an MCG RLF has occurred reports information on the MCG RLF to a base station according to various embodiments.

Referring to FIG. 12, when SRB1 is configured or is capable of being configured in the situation in which, since an MCG RLF has occurred, it is necessary for a terminal 1230 (e.g., the terminal 530) to forward information indicating that the MCG RLF has occurred (or information indicating that the MCG RLF has been triggered, an MCG RLF report, an MCG failure information, or MCG RLF information) to a base station, the terminal 1230 may forward the MCG RLF information to a secondary node 1220 (e.g., the base station node 520) via SRB1. In various embodiments, a failure report message may be defined, and the failure report message may include at least one of information indicating that the MCG RLF has occurred, a reason why the MCG RLF has occurred, or measurement report information. When the terminal 1230 notifies that the MCG RLF has occurred via SRB3 since a master cell group cannot be used, the cell group used may become a secondary cell group. In the case of split SRB1, since the anchor node becomes the master node 1210 (e.g., the base station node 510), the failure report message is not directly forwarded to the secondary node. In other words, by the structure of split SRB1 described with reference to FIG. 8, a packet transmitted to the secondary cell group may be transmitted from an RLC entity connected to the secondary cell group to a PDCP entity and may then be forwarded to an RRC entity of the master node.

Figure 13:
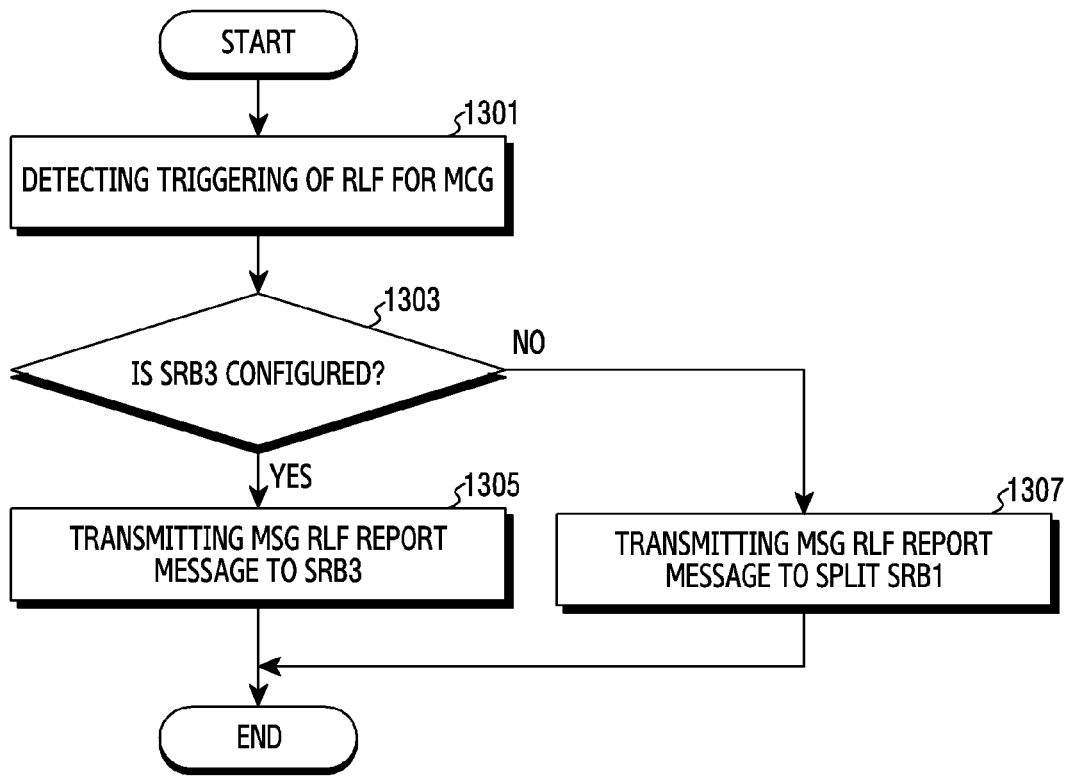
FIG. 13 illustrates a flowchart of a terminal for determining a radio bearer for transmitting a failure report message when an MCG RLF has occurred, according to various embodiments.

FIG. 13 is a flowchart of a terminal for determining a radio bearer for transmitting a failure report message when an MCG RLF has occurred, according to various embodiments. FIG. 13 exemplifies an operation method of the terminal 530.

Referring to FIG. 13, in step 1301, the terminal may detect triggering of the RLF for the MCG. In other words, the terminal may detect that the MCG RLF has been triggered.

In step 1303, the terminal may determine whether SRB3 is configured. When it is necessary for the terminal to transmit a failure report message to the secondary cell group due to the occurrence of an MCG RLF, the terminal may determine which radio bearer to use based on whether SRB3 is configured. When SRB3 is configured (Yes in step 1303), the terminal may perform step 1305. Unlike this, when SRB3 is not configured (No in step 1303), the terminal may perform step 1307.

In step 1305, the terminal may transmit an MCG RLF report message (or a failure report message) to the base station via the configured SRB3. As described above with reference to FIG. 11, the base station (e.g., the secondary node 1120), which receives the failure report message, may forward again the failure report message to the master node (e.g., the master node 1110).

In step 1307, the terminal may transmit the MCG RLF report message (or the failure report message) to the base station via split SRB1. When the terminal is capable of configuring split SRB1 even though split SRB1 is not configured, the terminal may generate a message of split SRB1 and may transmit the message of split SRB1 to the base station (e.g., the base station node 520) via the secondary cell group.

Figure 14:
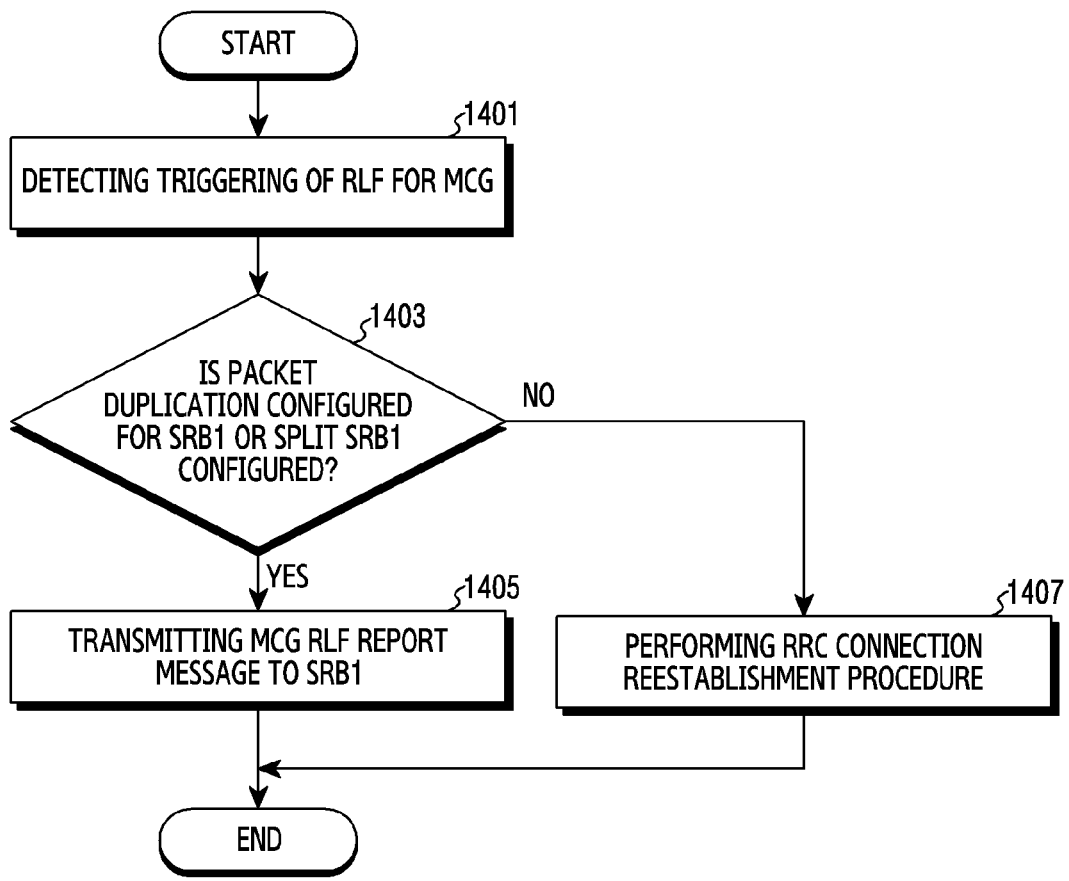
FIG. 14 illustrates a flowchart f a terminal for transmitting an MCG RLF report message when an MCG RLF has occurred, according to various embodiments.

FIG. 14 is a flowchart of a terminal for transmitting an MCG RLF report message when an MCG RLF has occurred, according to various embodiments. FIG. 14 exemplifies a method of operating the terminal 120.

Referring to FIG. 14, in step 1401, the terminal may detect triggering of the RLF for the MCG. In other words, the terminal may detect that the MCG RLF has been triggered. For example, the terminal may transmit a failure report message to a secondary cell group only when split SRB1 is configured. In this case, the terminal may determine to perform an RRC connection reestablishment procedure depending on whether split SRB1 is configured.

In step 1403, the terminal may determine whether SRB1 is configured or whether packet duplication is configured for SRB1. When SRB1 is configured or the packet duplication is configured for SRB1 (Yes in step 1403), the terminal may perform step 1405. Unlike this, when SRB1 is not configured or the packet duplication is not configured for SRB1, the terminal may perform step 1407.

In step 1405, the terminal may transmit an MCG RLF report message (or a failure report message) to SRB1. For example, the terminal may transmit the MCG RLF report message to split SRB1 or SRB1 in which packet duplication has been configured. For this purpose, packet duplication transmission may be activated.

In step 1407, the terminal may perform an RRC connection reestablishment procedure. For example, the terminal may perform the RRC connection reestablishment procedure in order to configure an RRC connection including the configuration of SRB1 and/or split SRB1.

Figure 15:
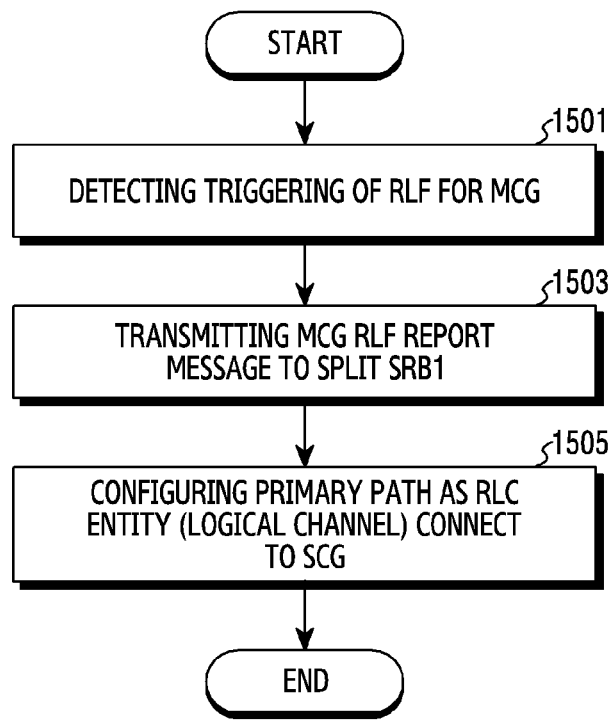
FIG. 15 illustrates a flowchart of a terminal for configuring a primary path when an MCG RLF has occurred, according to various embodiments.

FIG. 15 illustrates a flowchart of a terminal for configuring a primary path when an MCG RLF has occurred, according to various embodiments. FIG. 15 exemplifies a method of operating the terminal 120.

Referring to FIG. 15, in step 1501, the terminal may detect triggering of an RLF for an MCG. In other words, the terminal may detect that the MCG RLF has been triggered.

In step 1503, the terminal may transmit an MCG RLF report message (or a failure report message) to split SRB1. For example, when split SRB1 is configured, when the packet duplication transmission of SRB1 is configured, and/or when split SRB1 is capable of being configured, the terminal may transmit the MCG RLF report message to split SRB1.

In step 1505, the terminal may configure the primary path as an RLC entity (logical channel) connected to the SCG. When the primary RLC entity of split SRB1 is an RLC entity connected to a master cell group and a threshold for split ul-DataSplitThreshold is not 0 in the situation in which split SRB1 is used, the terminal may not be capable of transmitting a failure report message to the secondary cell group. For this purpose, the terminal may change the primary RLC entity to an RLC entity (logical channel) connected to the secondary cell group. Accordingly, the terminal may transmit data to the RLC entity connected to the secondary logical channel. In various embodiments, the order in which steps 1503 and 1505 are performed may be changed.

Figure 16:
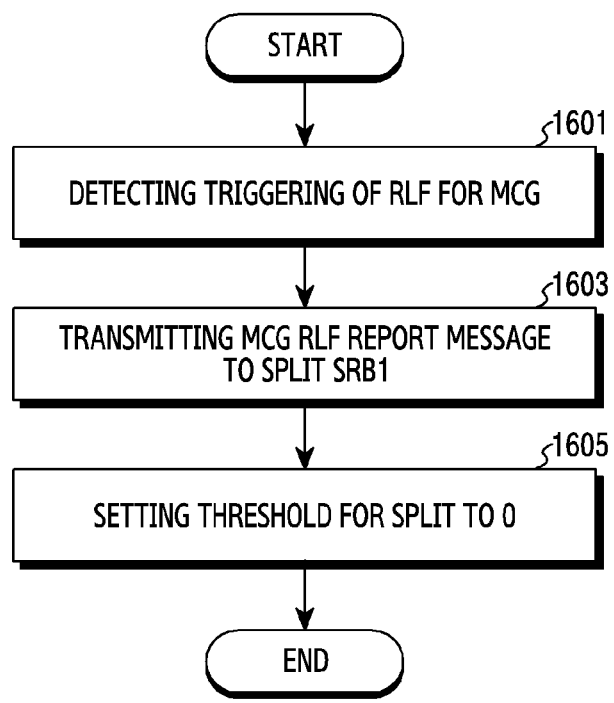
FIG. 16 illustrates a flowchart of a terminal for configuring a threshold for split when an MCG RLF has occurred, according to various embodiments.

FIG. 16 illustrates a flowchart of a terminal for configuring a threshold for split when an MCG RLF has occurred, according to various embodiments. FIG. 16 exemplifies a method of operating the terminal 530.

Referring to FIG. 16, in step 1601, the terminal may detect triggering of the RLF for the MCG. In other words, the terminal may detect that the MCG RLF has been triggered.

In step 1603, the terminal may transmit an MCG RLF report message (or a failure report message) to split SRB1. For example, when split SRB1 is configured, when the packet duplication transmission of SRB1 is configured, and/or when split SRB1 is capable of being configured, the terminal may transmit the MCG RLF report message to split SRB1.

In step 1605, the terminal may set the threshold ul-DataSplitThreshold for split to 0. When the primary RLC entity of split SRB1 is an RLC entity connected to a master cell group and a threshold for split ul-DataSplitThreshold is not 0 in the situation in which split SRB1 is used, the terminal may not be capable of transmitting a failure report message to the secondary cell group. For this purpose, the terminal may set the threshold ul-DataSplitThreshold for split to 0. In various embodiments, the threshold ul-DataSplitThreshold may be temporarily set to zero, or the state in which the threshold ul-DataSplitThreshold is set to zero may be continuously maintained.

In various embodiments, the terminal may transmit the MCG RLF report message to an RLC entity connected to the secondary cell group regardless of the threshold for split or the primary RLC entity. In addition, the terminal may transmit all SRB1 messages occurring in the MCG RLF situation regardless of the threshold for split or the primary RLC entity to the RLC entity connected to the secondary cell group. As another example, the terminal may activate packet duplication transmission and may cause the message of SRB1 to be transmitted to all the RLC entities. The terminal may transmit data to an RLC entity connected to the secondary logical channel using at least one of the above-described methods. In various embodiments, the order in which steps 1603 and 1605 are performed may be changed.

Figure 17:
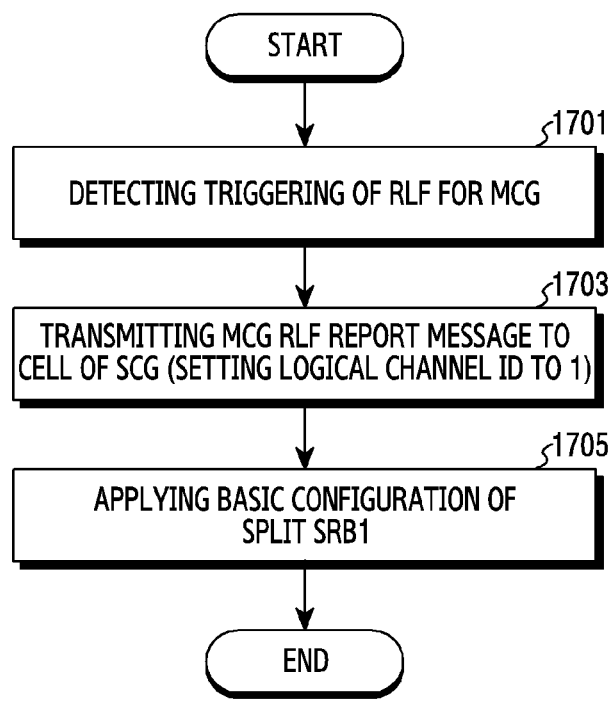
FIG. 17 illustrates a flowchart of a terminal for configuring a split SRB1 when an MCG RLF has occurred, according to various embodiments.

FIG. 17 illustrates a flowchart of a terminal for configuring a split SRB1 when an MCG RLF has occurred, according to various embodiments; FIG. 17 exemplifies a method of operating the terminal 530.

Referring to FIG. 17, in step 1701, the terminal may detect triggering of the RLF for the MCG. In other words, the terminal may detect that the MCG RLF has been triggered.

In step 1703, the terminal may transmit an MCG RLF report message (or a failure report message) to a cell of an SCG. For example, the terminal may transmit the MCG RLF report message to split SRB1. However, when split SRB1 is not configured, it is impossible to transmit the MCG RLF report message. Thus, the terminal may activate an RLC entity connected to the secondary cell group so as to configure split SRB1. For this purpose, when the terminal set a logical channel identifier (ID) in the RLC entity connected to the secondary cell group to a specific value and transmits the MCG RLF report message to the secondary cell group, a base station (e.g., the base station node 520), which receives the MCG RLF report message, may identify that split SRB1 has been generated by receiving the corresponding logical channel ID. In various embodiments, the logical channel ID having the specific value may be a value of 1, which is a logical channel ID for SRB1. In addition, the terminal may activate a reception RLC entity to receive downlink data transmitted to split SRB1.

In step 1705, the terminal may apply the basic configuration of split SRB1. For example, in the case in which the setting value of an applicable split SRB1 does not exist when split SRB1 is generated, the terminal may apply the default value of split SRB1. In various embodiments, the order in which steps 1703 and 1705 are performed may be changed.

Figure 18:
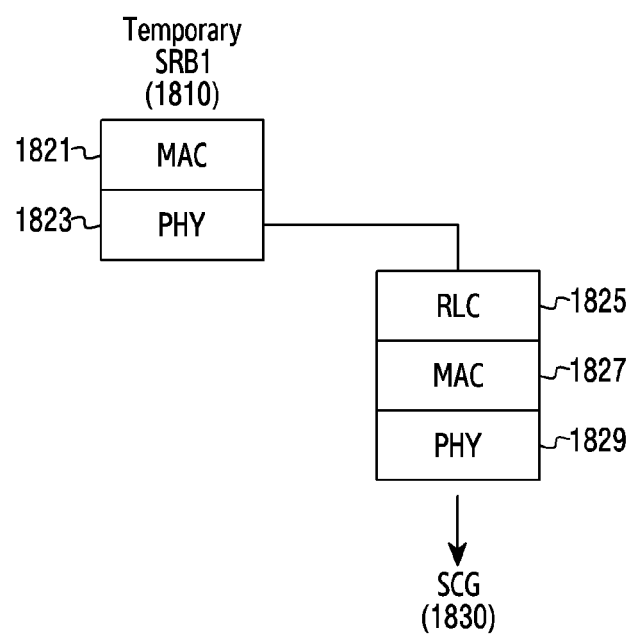
FIG. 18 illustrates a protocol structure of temporary SRB1 that may be used when an MCG RLF occurs, according to various embodiments.

FIG. 18 illustrates a protocol structure of temporary SRB1 that may be used when an MCG RLF occurs, according to various embodiments.

When an MCG RLF has occurred for a terminal, split SRB1 may be used to transmit an MCG RLF report message (or a failure report message) including information indicating that the MCG RLF has occurred. However, because it is in the MCG RLF state, it is impossible to use an RLC entity connected to the master cell group among the RLC entities of split SRB1 and the following protocol stack. Accordingly, in this case, other types of SRB1 (or temporary SRB1) structures may be temporarily used.

Referring to FIG. 18, temporary SRB1 1810 may be configured to transmit an RRC message, and may be associated with the layers of an RRC 1821, a PDCP 1823, an RLC 1825, an MAC 1827, and a PHY 1829 from the top. Since there is only one RLC entity in temporary SRB1 1810, temporary SRB1 1810 may follow the operation of a non-split radio bearer. The cell group used for temporary SRB1 1810 may be a secondary group 1830. In addition, the RRC of temporary SRB1 1810 may be associated with a master node, and the master node may manage the RRC connection of a terminal. In other words, in the embodiment of FIG. 18, when an MCG RLF has occurred, the terminal notifies the base station that the MCG RLF has occurred using temporary SRB1 1810 based on the radio bearer structure of the structure of temporary SRB1 1810 described above.

Figure 19:
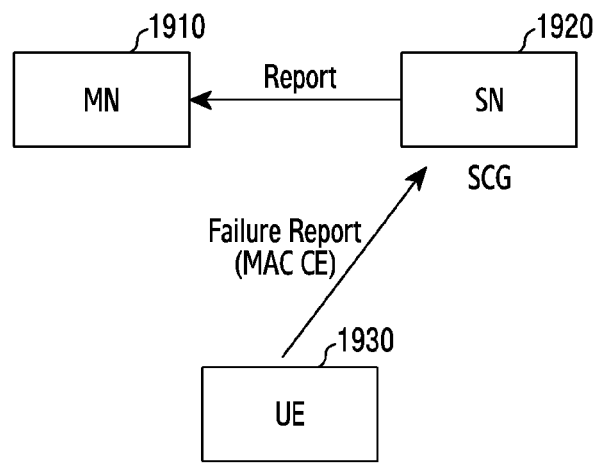
FIG. 19 illustrates an example of the case in which a terminal in which an MCG RLF has occurred reports a failure report message to a base station, according to various embodiments.

FIG. 19 illustrates an example of the case in which a terminal in which an MCG RLF has occurred reports a failure report message to a base station, according to various embodiments.

Referring to FIG. 19, when it is necessary to forward an MCG RLF report message to a base station due to the occurrence of the MCG RLF, a terminal 1930 (e.g., the terminal 530) may forward an MCG RLF report message to a secondary node 1920 (e.g., the base station node 520)

using an MAC control element (CE) of the secondary cell group. In various embodiments, a new MAC CE for forwarding an MCG RLF report message may be defined, and the MCG RLF report message may include at least one of information indicating that the MCG RLF has occurred, a reason why the MCG RLF has occurred, or measurement report information. Since the cell group to which the MCG RLF report message is transmitted is the secondary cell group, the base station receiving the MCG RLF report message via the MAC CE may be the secondary node 1920 or a distributed unit (DU) connected to the secondary node 1920. Accordingly, it can be necessary for the secondary node 1920 or the DU connected to the secondary node 1920 to transmit the MCG RLF report message to a master node 1910 (e.g., base station node 510) managing the MCG connection or a central unit (CU) of the master node 1910. In various embodiments, the content of the MCG RLF report message transmitted to the MAC CE may be forwarded from the secondary node 1920 to the master node 1910 as it is. In another embodiment, the secondary node 1920 may re-process information on the terminal in the MCG RLF has occurred and the reason for the occurrence of the MCG RLF using another message, and may transmit the re-processed information to the master node 1910.

Figure 20:
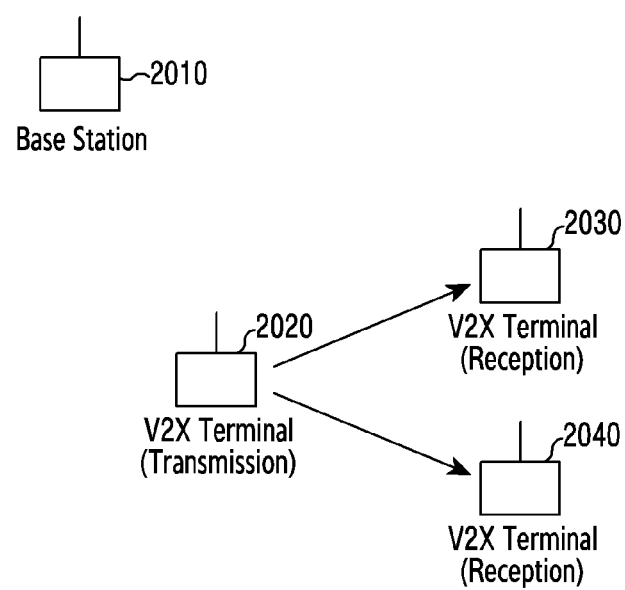
FIG. 20 illustrates a scenario for performing V2X communication between terminals in a wireless communication system according to various embodiments.

FIG. 20 illustrates a scenario for performing V2X communication between terminals in a wireless communication system according to various embodiments.

Referring to FIG. 20, in V2X communication, a V2X terminal 2020 (e.g., the terminal 120), a V2X terminal 2030 (e.g., the terminal 130), and a V2X terminal 2040 may directly perform communication with each other without communication with the base station 110. In various embodiments, a scheme of V2X communication (or a V2X communication scheme) may be one of the following schemes:

Unicast scheme: a scheme in which one transmission terminal communicates with one reception terminal Multicast scheme: a scheme in which one transmission terminal communicates with multiple specific reception terminals Broadcast scheme: a scheme in which one transmission terminal communicates with multiple unspecific reception terminals Which of the above schemes will be used may be determined based on the nature of traffics to transmitted and/or the nature of V2X terminals engaged in the communication. In various embodiments, a base station may determine a V2X communication scheme, and may forward the determined V2X communication scheme to a terminal through the RRC configuration.

In various embodiments, in order to support V2X communication regardless of the V2X communication scheme, a transmission V2X terminal 2020 may transmit data for V2X communication to one or more V2X terminals 2030 and 2040. According to an embodiment, the data transmitted by the transmission V2X terminal 2020 may be received only by terminals that are allowed to receive data transmitted by the transmission V2X terminal 2020. In various embodiments, when the V2X communication is performed within the coverage of the base station 2010, the base station 2010 may control the V2X communication. In this case, the base station 2010 may perform at least one function among RRC connection configuration, radio resource (frequency and time resource) allocation, transmission scheme configuration, radio bearer configuration, and quality of service (QoS).

Figure 21:
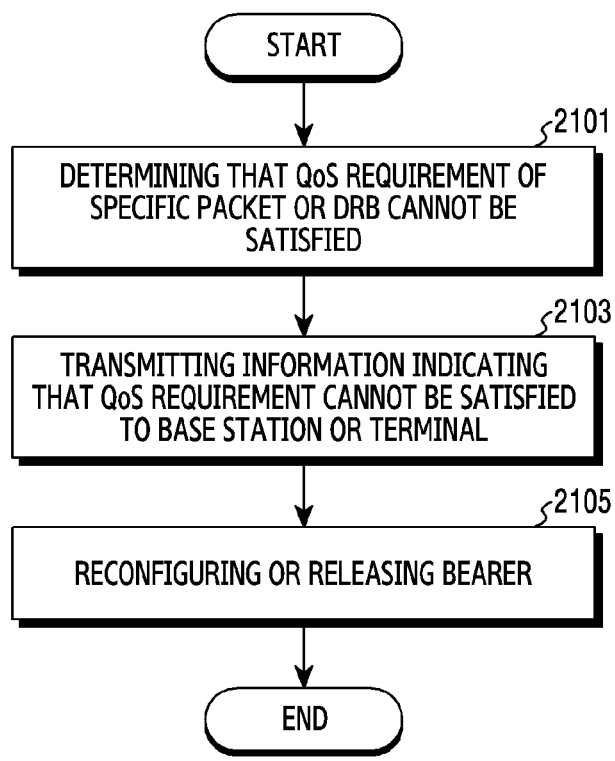
FIG. 21 illustrates a flowchart of a terminal when QoS requirements for V2X communication are not satisfied in a wireless communication system according various embodiments.

FIG. 21 illustrates a flowchart of a terminal when QoS requirements for V2X communication are not satisfied in a wireless communication system according various embodiments. FIG. 21 exemplifies a method of operating a V2X terminal 2020, 2030, or 2040.

Referring to FIG. 21, in step 2101, a terminal may determine that QoS requirements of a specific packet or a DRB cannot be satisfied. In the V2X communication, since the V2X terminal performs direct data communication with another V2X terminal rather than with a base station, it may be difficult for the base station to determine whether a transmitted traffic satisfies QoS requirements. Accordingly, it can be necessary to check whether or not the QoS requirements of the V2X terminal engaged in data communication are satisfied. For example, at least one of the transmission V2X terminal 2020 or the reception V2X terminals 2030 and 2040 engaged in the V2X communication illustrated in FIG. 20 may determine whether the QoS requirements of processed data are satisfied. According to an embodiment, a V2X terminal may monitor whether a specific packet or data processed in a specific DRB satisfies QoS requirements. For example, the V2X terminal may monitor a packet scheduled for a predetermined time so as to determine whether individual packets or packets of the same type satisfy QoS requirements of the corresponding packet. In various embodiments, the QoS requirements may include at least one of latency, reliability, data rate, or loss rate. For example, the QoS requirements of a packet may be mapped to V2X QoS ID (VQI) of that packet. Accordingly, a packet transmitted by the V2X terminal may have a VQI value corresponding thereto and there may be QoS requirements corresponding to the VQI. According to an embodiment, the V2X terminal may monitor whether packets of the same VQI are capable of satisfying QoS requirements for a predetermined time. In various embodiments, the predetermined time may be pre-configured or configured by the base station.

In step 2103, a terminal may transmit information indicating that QoS requirements cannot be satisfied to a base station and/or another terminal. In other words, when the QoS requirements cannot be satisfied, a pre-configured V2X terminal (a transmission V2X terminal and/or a reception V2X terminal) may indicate that the QoS requirements cannot be satisfied to a base station or another V2X terminal. In various embodiments, the information indicating that QoS requirements cannot be satisfied may include at least one of the ID of a radio bearer that does not satisfy the QoS requirements, a QoS flow ID (QFI), the type of unsatisfactory QoS requirements, or information about the unsatisfactory degree of the unsatisfactory QoS requirements. According to various embodiments, a transmission V2X terminal may transmit information indicating that the QoS requirements of the terminal cannot be satisfied to the neighboring terminals based on the broadcast scheme.

In step 2105, the terminal may reconfigure or release a bearer. For example, a V2X terminal capable of configuring a base station or a radio bearer may perform RRC connection reconfiguration including a radio bearer that does not satisfy the QoS requirements. The RRC connection reconfiguration may include at least one of reconfiguration or releasing of a radio bearer.

Figure 22:
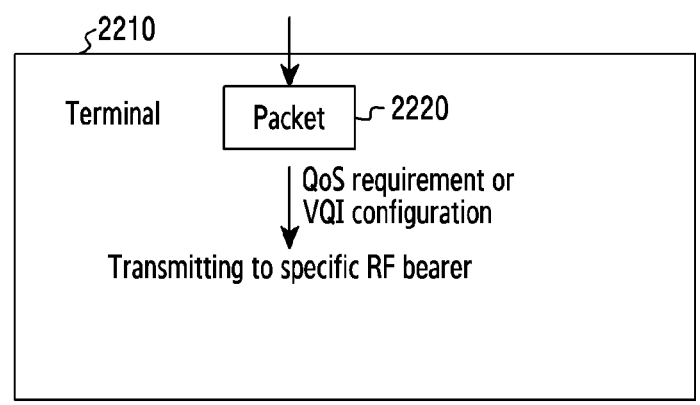
FIG. 22 illustrates an example of the case in which a V2X terminal maps a packet to a radio bearer in a wireless communication system according to various embodiments.

FIG. 22 illustrates an example of the case in which a V2X terminal maps a packet to a radio bearer in a wireless communication system according to various embodiments.

Referring to FIG. 22, when a packet 2220 is generated in an upper layer such as an application layer of a V2X terminal 2210 (e.g., the V2X terminal 2020, 2030, or 2040) and forwarded to layer 2 (e.g., a service data application protocol (SDAP)) of the V2X terminal 2210, the V2X terminal 2210 may determine what kind of packet the packet 2220 is. For example, the V2X terminal 2210 may determine what kind of packet the packet 2220 is by interpreting the data of the V2X terminal 2210, and the V2X terminal 2210 may identify the QoS requirements of the packet 2220. Through the QoS requirements, the V2X terminal 2210 may configure a VQI corresponding to the packet 2220. When the QoS requirements or the VQI are configured for the packet 2220, the V2X terminal 2210 may determine to which radio bearer the packet 2220 is to be transmitted. For example, the radio bearer, to which the packet 2220 is to be transmitted, may be determined by a radio bearer and a logical channel configured by a base station, or may be determined as a radio bearer required for the V2X terminal 2210 to satisfy the QoS requirements. The packet 2220 may be transmitted to the determined radio bearer.

Figure 23:
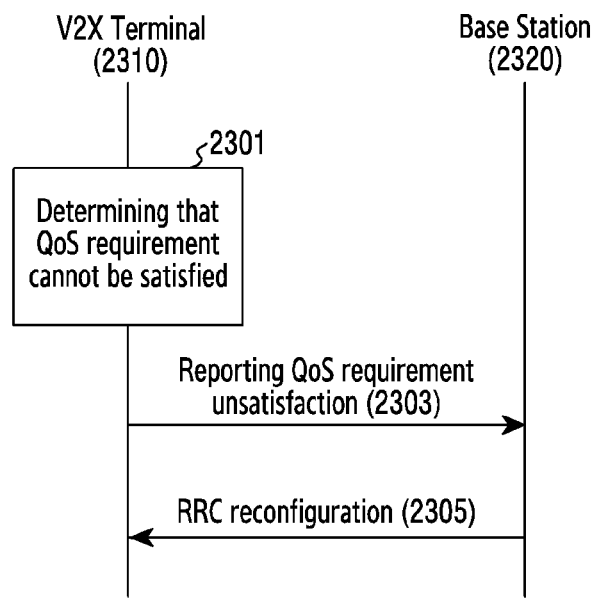
FIG. 23 illustrates a signal flow between a terminal and a base station when QoS requirements are not satisfied in V2X communication in a wireless communication system according to various embodiments.

FIG. 23 illustrates a signal flow between a terminal and a base station when QoS requirements are not satisfied in V2X communication in a wireless communication system according to various embodiments.

Referring to FIG. 23, in step 2301, a V2X terminal 2310 (e.g., the V2X terminal 2020, 2030, or 2040) may determine that QoS requirements cannot be satisfied. In V2X communication, since the V2X terminal 2310 performs data communication directly with another V2X terminal rather than with a base station 2320 (e.g., the base station 2010), it may be difficult for the base station 2320 to determine whether a transmitted traffic satisfies the QoS requirements. Accordingly, it can be necessary for the V2X terminal 2310 engaged in the data communication to check whether or not the QoS requirements are satisfied. For example, at least one of the transmission V2X terminal 2020 or the reception V2X terminals 2030 and 2040 engaged in the V2X communication illustrated in FIG. 20 may determine whether the QoS requirements of processed data are satisfied. According to an embodiment, the V2X terminal 2310 may monitor whether a specific packet or data processed in a specific DRB satisfies the QoS requirements. For example, the V2X terminal 2310 may monitor a packet scheduled for a predetermined time so as to determine whether individual packets or packets of the same type satisfy the QoS requirements of the corresponding packet. In various embodiments, the QoS requirements may include at least one of latency, reliability, data rate, or loss rate. For example, the QoS requirements of a packet may be mapped to V2X QoS ID (VQI) of that packet. Accordingly, a packet transmitted by the V2X terminal 2310 may have a VQI value corresponding thereto and there may be QoS requirements corresponding to the VQI. According to an embodiment, the V2X terminal 2310 may monitor whether packets of the same VQI are capable of satisfying the QoS requirements for a predetermined time. In various embodiments, the predetermined time may be pre-configured or configured by the base station.

In step 2303, the V2X terminal 2310 may report to the base station 2320 that the QoS requirements have not been satisfied. For example, the V2X terminal 2310 may forward, to the base station 2320, a message (or a QoS requirement unsatisfaction report message) indicating that QoS requirements are not satisfied for the data packet, which is being processed by the V2X terminal 2310. In various embodiments, the QoS requirement unsatisfaction report message may include at least one of the ID of a radio bearer that does not satisfy the QoS requirements, a QoS flow ID (QFI), the type of unsatisfactory QoS requirements, the unsatisfactory degree of the unsatisfactory QoS requirements, a transmission terminal ID, or a reception terminal ID.

In step 2305, the base station 2320 may transmit an RRC connection reconfiguration message to the V2X terminal 2310. For example, in response to receiving the QoS requirement unsatisfaction report message, the base station 2320 may transmit an RRC connection reconfiguration message to the V2X terminal 2310 in order to reconfigure a radio bearer in which the QoS requirements are not satisfied.

Figure 24:
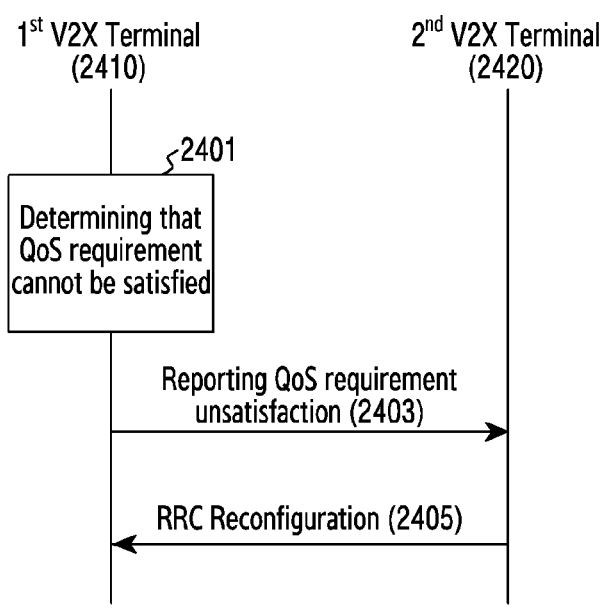
FIG. 24 illustrates a signal flow between a terminal and another terminal when QoS requirements are not satisfied in V2X communication in a wireless communication system according to various embodiments.

FIG. 24 illustrates a signal flow between a terminal and another terminal when QoS requirements are not satisfied in V2X communication in a wireless communication system according to various embodiments.

Referring to FIG. 24, in step 2401, a first V2X terminal 2410 (e.g., the V2X terminal 2020) may determine that QoS requirements cannot be satisfied. In the V2X communication, since the first V2X terminal 2410 performs direct data communication with another V2X terminal rather than with a base station, it may be difficult for the base station to determine whether a transmitted traffic satisfies QoS requirements. Accordingly, it can be necessary for the first V2X terminal 2410 engaged in the data communication to check whether or not the QoS requirements are satisfied. For example, at least one of the transmission V2X terminal 2020 or the reception V2X terminals 2030 and 2040 engaged in the V2X communication illustrated in FIG. 20 may determine whether the QoS requirements of processed data are satisfied. According to an embodiment, the first V2X terminal 2410 may monitor whether a specific packet or data processed in a specific DRB satisfies the QoS requirements. For example, the first V2X terminal 2410 may monitor a packet scheduled for a predetermined time so as to determine whether individual packets or packets of the same type satisfy the QoS requirements of the corresponding packet. In various embodiments, the QoS requirements may include at least one of latency, reliability, data rate, or loss rate. For example, the QoS requirements of a packet may be mapped to V2X QoS ID (VQI) of that packet. Accordingly, a packet transmitted by the first V2X terminal 2410 may have a VQI value corresponding thereto and there may be QoS requirements corresponding to the VQI. According to an embodiment, the first V2X terminal 2410 may monitor whether packets of the same VQI are capable of satisfying the QoS requirements for a predetermined time. In various embodiments, the predetermined time may be pre-configured or configured by the base station. The embodiment described with reference to FIG. 24 is applicable when the first V2X terminal 2410, which monitors whether the QoS requirements are satisfied and the second V2X terminal 2420 (e.g., the V2X terminals 2030 or 2040), which performs RRC configuration, are different from each other.

In step 2403, the first V2X terminal 2410 may report to the second V2X terminal 2420 that the QoS requirements have not been satisfied. For example, the first V2X terminal 2410 may forward, to the second V2X terminal 2420, a message (or a QoS requirement unsatisfaction report message) indicating that QoS requirements are not satisfied for the data packet, which is being processed by the first V2X terminal 2410. In various embodiments, the QoS requirement unsatisfaction report message may include at least one of the ID of a radio bearer that does not satisfy the QoS requirements, a QoS flow ID (QFI), the type of unsatisfactory QoS requirements, the unsatisfactory degree of the unsatisfactory QoS requirements, a transmission terminal ID, or a reception terminal ID.

In step 2405, the second terminal 2420 may transmit an RRC connection reconfiguration message to the first V2X terminal 2410. For example, in response to receiving the QoS requirement unsatisfaction report message, the second V2X terminal may transmit an RRC connection reconfiguration message to the first V2X terminal 2410 in order to reconfigure a radio bearer in which the QoS requirements are not satisfied. In various embodiments, when the first V2X terminal 2410 is a reception V2X terminal, the V2X communication scheme of FIG. 24 may be a multicast scheme or a broadcast scheme, and the number of V2X terminals capable of transmitting the QoS requirement unsatisfaction report message including the first V2X terminal 2410 may be two or more. According to an embodiment, only a specific terminal and/or a predetermined terminal may be configured to transmit the QoS requirement dissatisfaction report message.

Figure 25:
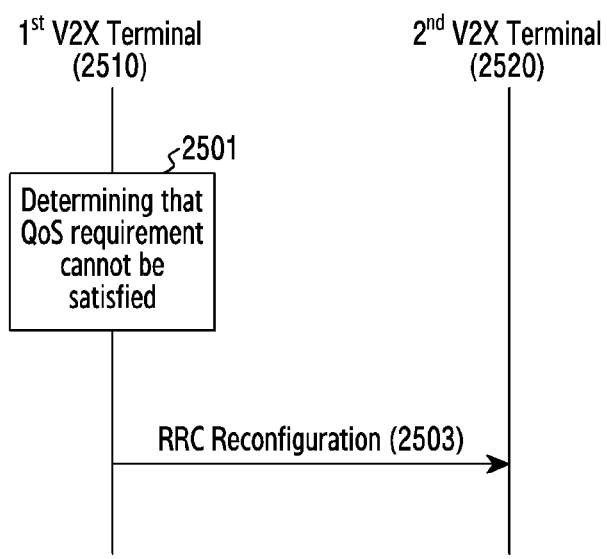
FIG. 25 illustrates a signal flow between terminals when QoS requirements are not satisfied in V2X communication in a wireless communication system according to various embodiments.

FIG. 25 illustrates a signal flow between terminals when QoS requirements are not satisfied in V2X communication in a wireless communication system according to various embodiments.

Referring to FIG. 25, in step 2501, a first V2X terminal 2510 (e.g., the V2X terminal 2020) may determine that QoS requirements cannot be satisfied. In the V2X communication, since the first V2X terminal 2510 performs direct data communication with another V2X terminal rather than with a base station, it may be difficult for the base station to determine whether a transmitted traffic satisfies QoS requirements. Accordingly, it can be necessary for the first V2X terminal 2510 engaged in the data communication to check whether or not the QoS requirements are satisfied. For example, at least one of the transmission V2X terminal 2020 or the reception V2X terminals 2030 and 2040 engaged in the V2X communication illustrated in FIG. 20 may determine whether the QoS requirements of processed data are satisfied. According to an embodiment, the first V2X terminal 2510 may monitor whether a specific packet or data processed in a specific DRB satisfies the QoS requirements. For example, the first V2X terminal 2510 may monitor a packet scheduled for a predetermined time so as to determine whether individual packets or packets of the same type satisfy the QoS requirements of the corresponding packet. In various embodiments, the QoS requirements may include at least one of latency, reliability, data rate, or loss rate. For example, the QoS requirements of a packet may be mapped to V2X QoS ID (VQI) of that packet. Accordingly, a packet transmitted by the first V2X terminal 2510 may have a VQI value corresponding thereto and there may be QoS requirements corresponding to the VQI. According to an embodiment, the first V2X terminal 2510 may monitor whether packets of the same VQI are capable of satisfying the QoS requirements for a predetermined time. In various embodiments, the predetermined time may be pre-configured or configured by the base station. The embodiment described with reference to FIG. 25 is applicable when the first V2X terminal 2510, which monitors whether the QoS requirements are satisfied, is capable of performing RRC configuration.

In step 2503, the first V2X terminal 2510 may transmit an RRC connection reconfiguration message to a second V2X terminal 2520 (e.g., the V2X terminal 2030 or 2040). For example, when the first V2X terminal 2520 determines that the QoS requirements cannot be satisfied, the first V2X terminal 2510 may transmit an RRC connection reconfiguration message to the second V2X terminal 2520. The transmission of the RRC connection reconfiguration message by the first V2X terminal 2510 may mean that the first V2X terminal 2510 performs reconfiguration of a radio bearer that cannot directly satisfy the QoS requirements. For example, the first V2X terminal 2510 may transmit, according to the broadcast scheme, to an arbitrary V2X terminal therearound that the QoS requirements of the packet processed by the first V2X terminal 2510 cannot be satisfied. The transmission according to the broadcast scheme means that the number of V2X terminals, which receive the RRC connection reconfiguration message, may be two or more including the second V2X terminal 2520. How the terminal performs reconfiguration of the radio bearer may be determined based on a predetermined rule. In various embodiments, the predetermined rule may include at least one of an operation of processing a packet of a VQI that cannot satisfy QoS requirements in a default bearer, an operation of releasing a radio bearer, to which a packet that cannot satisfy the QoS requirements is transmitted, an operation of releasing the lowest priority radio bearer among the bearers (in this case, data that was being processed by the released radio bearer may then be processed by the default bearer), or an operation of not processing any more the packet of the VQI that cannot satisfy the QoS requirements. In various embodiments, when the predetermined rule is applied, the predetermined rule may be applied only to data that is not a safety message.

Figure 26:
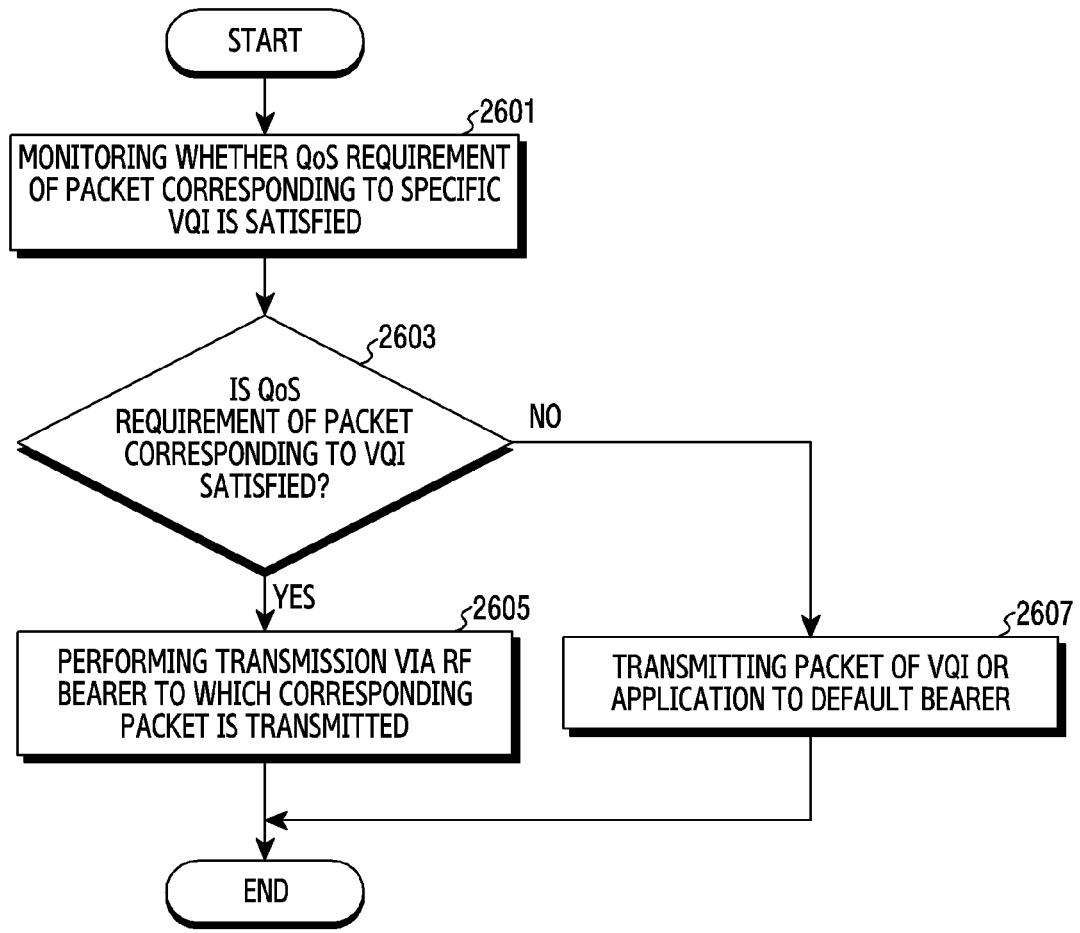
FIG. 26 illustrates a flow chart of a terminal for transmitting a packet by monitoring QoS requirements in V2X communication in a wireless communication system according to various embodiments.

FIG. 26 illustrates a flow chart of a terminal for transmitting a packet by monitoring QoS requirements in V2X communication in a wireless communication system according to various embodiments. FIG. 26 exemplifies a method of operating a V2X terminal 2020 or a V2X terminal 2030.

Referring to FIG. 26, in step 2601, a terminal may monitor whether QoS requirements of a packet corresponding to a specific VQI are satisfied. The terminal monitoring whether the QoS requirements of a packet processed by the terminal is satisfied may determine, for each packet to be processed, whether the QoS requirements of the packet corresponding to the VQI of the packet are satisfied. In various embodiments, whether the QoS requirements are satisfied may be monitored for each packet, or whether data of the same VQI is meeting the QoS requirements for a preset time.

In step 2603, the terminal may monitor whether the QoS requirements of a packet corresponding to a VQI are satisfied. When the QoS requirements of a packet corresponding to the VQI is satisfied (step 2603: Yes), the terminal may perform step 2605. Unlike this, when the QoS requirements of a packet corresponding to the VQI are satisfied (step 2603: No), the terminal may perform step 2607.

In step 2605, the terminal may perform transmission via a radio bearer to which the corresponding packet is transmitted. In other words, since the QoS requirements are satisfied for the radio bearer, the terminal may continuously transmit packets via the existing radio bearer.

In step 2607, the terminal may transmit the packet of the VQI or application to a default bearer. In an embodiment, the terminal may not process the packet of the VQI or application any more instead of transmitting the packet to the default bearer. In other embodiments, the terminal may not process the packet of the lowest priority VQI that the terminal was processing, or may transmit the packet to the default bearer.

Figure 27:
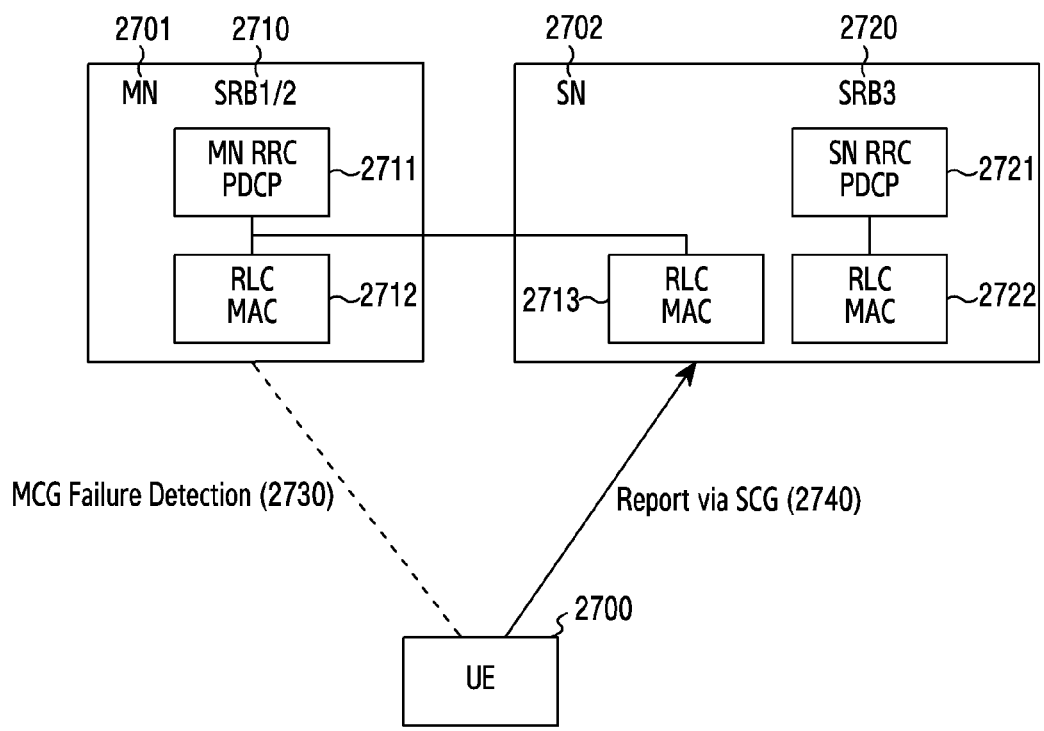
FIG. 27 illustrates an SRB structure of a base station and a method of notifying a base station of an MCG failure by when the MCG failure occurs.

FIG. 27 illustrates a structure of a signaling radio bearer (SRB) of a base station and a method of notifying a base station of an MCG failure by a terminal 2700 when the MCG failure occurs. The SRB is a radio bearer for configuring radio resource control (RRC) of the base station, and the base station instructs a procedure of RRC configuration, reconfiguration, and reestablishment via the SRB. In addition, the terminal 2700 may send a response message in response to the configuration, reconfiguration, and reestablishment messages of the base station via the SRB, and may transmit a message that should be triggered by the terminal 2700. For example, the terminal 2700 may transmit an SCG failure information message, which is transmitted when an SCG failure has occurred, using the SRB. The SRB may be divided into and configured as SRB1, SRB2, SRB3, and so on according to the purpose. SRB1 2710 and SRB2 2710 are configured between a master node 2701 and the terminal 2700, and SRB3 2720 is configured between a secondary node 2702 and the terminal 2700. SRB1 2710 is mainly used for transmission of messages for direct connection between the terminal 2700 and the base station. SRB2 2710 is mainly used for transmission of NAS messages between a core network and the terminal 2700. SRB3 2720 is used for transmission of messages for direct connection between the secondary node and the terminal 2700. In this case, for SRB1 2710 and SRB2 2710, RRC and PDCP are located in the master node 2701 (2711), and RLC and MAC may exist in the master node 2701 and the secondary node 2702, respectively (2712, 2713). In this case, when the RLC is located only in the MCG, the SRB is referred to as a non-split SRB, and when the RLC is located in the MCG and the SCG, the SRB is referred to as a split SRB. For example, SRB1 may be referred to as split SRB1. In contrast, for SRB3, RRC and PDCP are located at the secondary node (2721), and RLC and MAC are also located at the secondary node (2722). In the embodiment of FIG. 27, although only some SRBs have been described, a data radio bearer (DRB) to which data is transmitted may also be also configured when the terminal 2700 and the base station are connected.

When the terminal 2700 senses an MCG failure due to an MCG RLF, a failure of reconfiguration with synchronization, or the like (2730), the transmission using the MCG is no longer possible. Thus, it can be necessary to inform the base station that the MCG failure has occurred. In this case, when an SCG link is available, the terminal 2700 may transmit a corresponding message using the SCG (2740). In this case, when SRB1 is configured, split SRB1 2710 may be used, and when SRB3 is configured, corresponding MCG failure information may be transmitted to the secondary node via SRB3 2720. However, since the anchor node of SRB3 is the secondary node 2720, the corresponding information should be forwarded to the master node 2710 in charge of MCG connection. In this case, the content of the failure report message 2740 transmitted to SRB3 may be forwarded as it is. However, according to another embodiment, the secondary node 2720 may transmit information indicating which terminal has suffered from an MCG failure and why the MCG failure has occurred, using a message different from the failure report message. Subsequently, the base station or the master node 2710 of the base station may instruct handover to change the MCG of the terminal 2700 and reconfiguration with synchronization. According to some embodiments, role swap for exchanging roles of the master node 2701 and the secondary node 2702 may be instructed.

For example, the MCG failure information message may include the following information.

Which cell group has suffered from a failure (e.g., whether the failure is an MCG failure or an SCG failure)?

What type of failure has occurred (e.g., whether the failure is an RLF or a failure of reconfiguration with synchronization)?

Measurement report configured by the master node

Measurement report configured by the secondary node

When the secondary cell group is operated by another radio access technology (RAT), the message of the measurement report configured by the secondary node may be encoded through coding used in the RAT of the secondary cell group.

Figure 28:
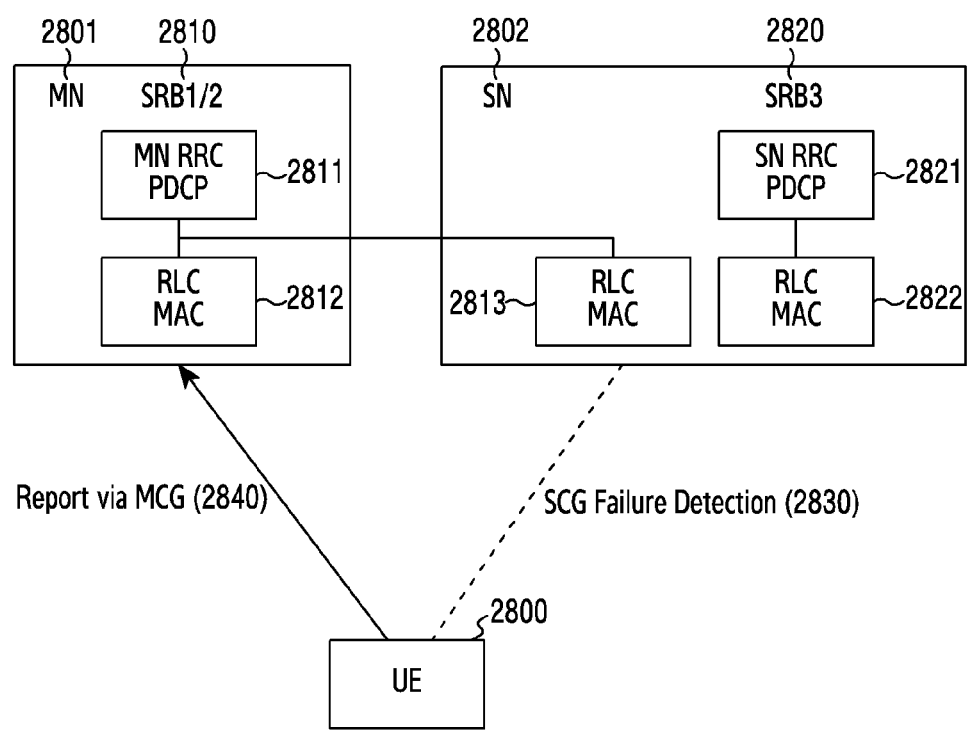
FIG. 28 illustrates an SRB structure of a base station and a method of notifying the base station of an SCG failure by a terminal when the SCG failure occurs.

FIG. 28 illustrates an SRB structure of a base station and a method of notifying the base station of an SCG failure by a terminal when the SCG failure occurs. A signaling radio bearer (SRB) is a radio bearer for radio resource control (RRC) configuration of the base station, and the base station instructs procedures of RRC configuration, reconfiguration, reestablishment, and the like via the SRB. In addition, the terminal may transmit a response message in response to the configuration, reconfiguration, and reestablishment messages of the base station via the SRB, and may transmit a message that should be triggered by the terminal. For example, an SCG failure information message, which is transmitted when an SCG failure has occurred, may be transmitted using the SRB. The SRB may be divided into and configured as SRB1, SRB2, SRB3, and so on according to the purpose. SRB1 2810 and SRB2 2810 are configured between the master node 2801 and the terminal, and SRB3 2820 is configured between the secondary node 2802 and the terminal. SRB1 2810 transmits messages for direct connection between the terminal and the base station SRB2 2810 is mainly used for transmission of NAS messages between a core network and the terminal. SRB3 2820 transmits messages for direct connection between the secondary node and the terminal. In this case, for SRB1 2810 and SRB2 2810, RRC and PDCP may be located in the master node (2811), and RLC and MAC may exist in the master node and the secondary node, respectively (2812, 2813). In this case, when the RLC is located only in the MCG, the SRB is referred to as a non-split SRB, and when the RLC is located in the MCG and the SCG, the SRB is referred to as a split SRB. That is, SRB1 may be referred to as split SRB1. In contrast, for SRB3, RRC and PDCP are located at the secondary node (2821), and RLC and MAC are also located at the secondary node (2822). In the embodiment of FIG. 28, although only some SRBs have been described, a data radio bearer (DRB) to which data is transmitted may also be also configured when the terminal and the base station are connected.

When the terminal 2800 senses an SCG failure due to an SCG RLF, a failure of SCG reconfiguration with synchronization, or the like (2830), the transmission using the SCG is no longer possible. Thus, it can be necessary to inform the base station that the MCG failure has occurred. In this case, when an MCG link is available, a corresponding MCG message may be transmitted using the SCG (2840). In this case, when SRB1 is configured, SRB1 2810 may be used. Subsequently, the base station or the master node of the base station may instruct an SCG change for changing the SCG of the terminal or reconfiguration with synchronization in order to solve the SCG failure.

Figure 29:
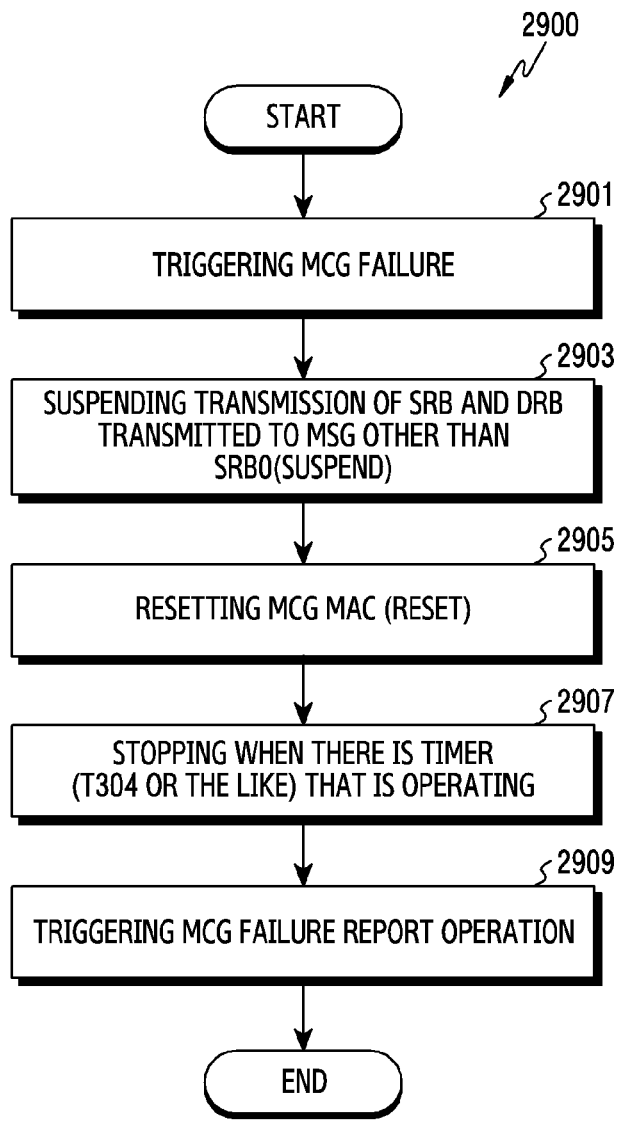
FIG. 29 illustrates an operation process of a terminal when an MCG failure occurs.

FIG. 29 illustrates an operation process 2900 of a terminal when an MCG failure occurs. The terminal may trigger a failure of a master cell group, that is, an MCG failure, for reasons, expiration of T310 timer, such as an MCG RLF, such as a random access failure or reaching the maximum number of retransmissions of RLC, other handover failures, a failure of reconfiguration with synchronization, or the like (2901). In the MCG failure situation, it is impossible to properly perform data transmission to the master cell group. Thus, transmission of all signaling radio bearers (SRBs) and data radio bearers (DRBs) transmitted to the master cell group may be suspended. However, at this time, SRB0 should not be suspended because it needs to be used when radio link reestablishment or the like occurs in the future (2903). In addition, since the MAC of the master cell group is not capable of being used any longer, the MAC of the master cell group may be reset (2905). In addition, when there is T304 timer that operates for the purpose of handover or the like or another timer that is operating, the timer may be stopped since the operation of the timer is no longer needed (2907). Thereafter, an MCG failure report operation may be triggered so as to notify the base station that the MCG failure has occurred. The notification may be sent via the secondary cell group. The radio bearer used in this case may be split SRB1 that is capable performing transmission to the secondary cell group or the SRB3 that performs direct transmission to the secondary node (2909).

Figure 30:
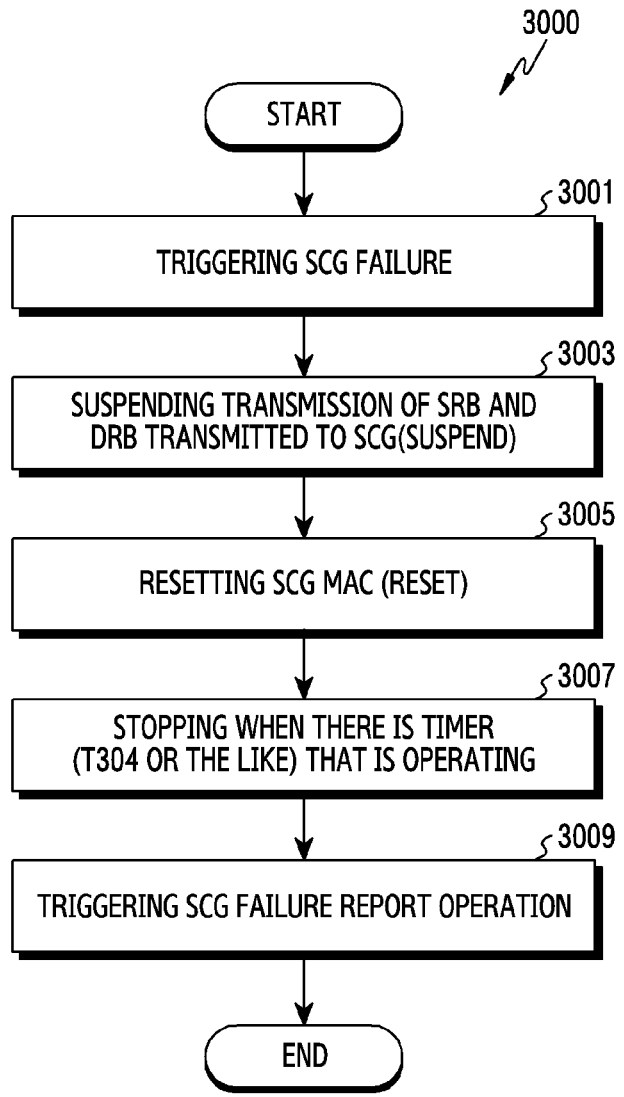
FIG. 30 illustrates an operation process of a terminal when an SCG failure occurs.

FIG. 30 illustrates an operation process 3000 of a terminal when an SCG failure occurs. The terminal may trigger a failure of a second cell group, that is, an SCG failure, for reasons, such as expiration of T313 timer, an SCG RLF, such as a random access failure to the SCG or reaching the maximum number of retransmissions in the SCG RLC, other SCG configuration failures, a failure of SCG reconfiguration with synchronization, or the like (3001). In the SCG failure situation, it is impossible to properly perform data transmission to the secondary cell group. Thus, transmission of all signaling radio bearers (SRBs) and data radio bearers (DRBs) transmitted to the secondary cell group may be suspended (3003). In addition, since the MAC of the secondary cell group is not capable of being used any longer, the MAC of the secondary cell group may be reset (3005). In addition, when there is T304 timer that operates for the purpose of handover or the like or another timer that is operating, the timer may be stopped since the operation of the timer is no longer needed (3007). Thereafter, an SCG failure report operation may be triggered so as to notify the base station that the SCG failure has occurred. The notification may be sent via the master cell group. The radio bearer used in this case may be SRB1 capable of performing transmission to the master cell group (3009).

Figure 31:
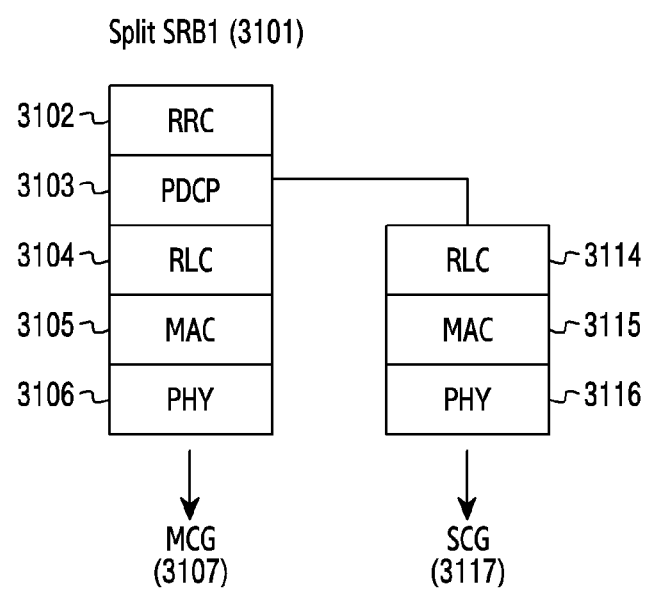
FIG. 31 illustrates a protocol structure of split SRB1.

FIG. 31 illustrates a protocol structure of split SRB1. Split SRB1 3101 may be configured to transmit an RRC message, and may have one layer of RRC 3102, one layer of packet data convergence protocol (PDCP) 3103, two or more layers of radio link controls (RLCs) 3104 and 3114, two or more layers of medium access controls (MACs) 3105 and 3115, and two or more layers of physical layers (PHYs) 3106 and 3116. In this case, the term "split" means that there are two or more RLC devices 3104 and 3114 for the corresponding radio bearer. In this case, the term "RLC device" may be used interchangeably with the terms "RLC bearer" and "logical channel". The cell groups used for split SRB1 may include one master cell group 3107 and one secondary cell group 3117. In addition, the RRC of split SRB1 may be located at a master node, and the master node may manage the RRC connection of a terminal. In this case, the RLC devices of split SRB1 3104 and split SRB1 3114 may be configured to be divided into a primary RLC (primary path) device used regardless of the amount of data to be sent and a secondary RLC (secondary path) device used when the data to be sent is greater than or equal to a threshold ul-DataSplitThreshold. The base station may inform the terminal of the threshold of the amount of data through RRC configuration. In addition, in the corresponding split SRB1, packet duplication may be performed for duplicating a packet in a PDCP device of a transmitter and transmitting all data to multiple RLC devices. When packet duplication transmission is activated, the multiple RLC devices may be used for packet transmission at the same time.

Figure 32:
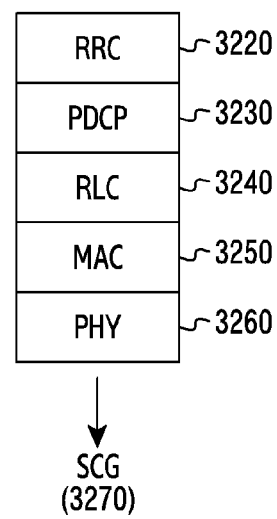
FIG. 32 illustrates a protocol structure of non-split SRB3.

FIG. 32 illustrates a protocol structure of a non-split signaling radio bearer 3 (SBR3). A non-split SRB3 3210 may be configured to transmit an RRC message, and may have one layer of RRC 3220, one layer of PDCP 3230, one layer of RLC 3240, one layer of MAC 3250, and one layer of PHY 3260. In this case, the term "split" means that there is one RLC device 3240 for the corresponding radio bearer. In this case, the term "RLC device" may be used interchangeably with the terms "RLC bearer" and "logical channel". A cell group used for non-split SRB3 may be the secondary cell group 3270. In addition, the RRC of SRB3 may be located at a secondary node, and the secondary node may manage some RRC connection of a terminal.

Figure 33:
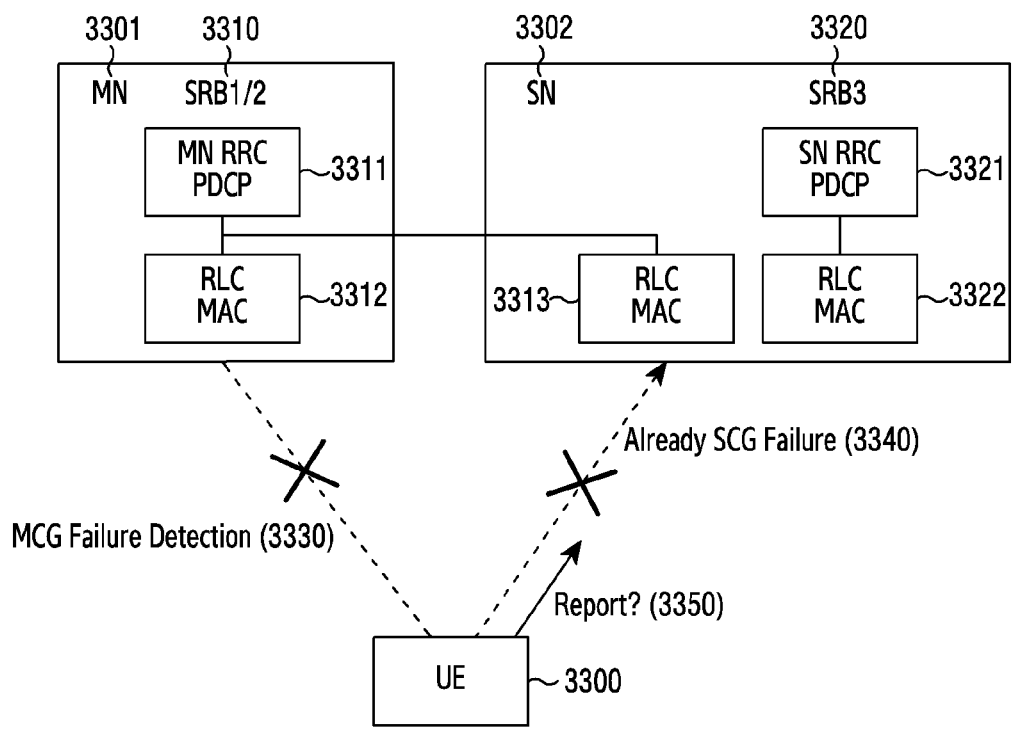
FIG. 33 illustrates a collision scenario of an MCG failure and an SCG failure.

FIG. 33 illustrates a collision scenario of an MCG failure and an SCG failure. As described above with reference to FIGS. 2 and 29, when an MCG failure occurs (3330), the terminal 3300 may transmit an MCG failure information message to the base station using split SRB1 3310 or SRB3 3320 connected to the SCG. However, when an MCG failure is sensed but an SCG failure was already occurred and the SCG failure operation described with reference to FIG. 30 is in progress (3340), the MCG failure report message cannot be transmitted to an SCG link. In addition, when an SCG failure was not sensed at the time when an MCG failure report was sensed (3330) but an MCG report message has not been transmitted, or even if an SCG failure is sensed lately in the case in which an MCG report message was transmitted but an RRC message was not received from the base station by SRB1, a recovery procedure based on the MCG failure report cannot be performed normally. Accordingly, in this case, MCG failure information cannot be reported (3350). Accordingly, in this case, it can be necessary for the terminal to perform an RRC reestablishment procedure, and the terminal may cancel transmission of a previously triggered MCG failure information message or SCG failure information message.

SRB1 3310 and SRB2 3310 are configured between the master node 3301 and the terminal, and SRB3 3320 is configured between the secondary node 3302 and the terminal. In this case, for SRB1 3310 and SRB2 3310, RRC and PDCP may be located in the master node (3311), and RLC and MAC may exist in the master node and the secondary node, respectively (3312, 3313). In this case, when the RLC is located only in the MCG, the SRB is referred to as a non-split SRB, and when the RLC is located in the MCG and the SCG, the SRB is referred to as a split SRB. That is, SRB1 may be referred to as split SRB1. In contrast, for SRB3, RRC and PDCP are located at the secondary node (3321), and RLC and MAC are also located at the secondary node (3322).

Specific operations performed when an MCG failure occurs in the embodiment of FIG. 33 are as follows.

When an SCG failure has already been declared at the time of MCG failure and the SCG failure has not been recovered (when an SCG failure information message has not been transmitted or when an RRC message has not been received from the base station after the transmission), the terminal performs an RRC reestablishment procedure. In this case, what the SCG failure has already been recovered after the declaration of the SCG failure, the SCG failure is not considered to have been declared.

When an SCG failure has not been declared at the time of MCG failure, or when the SCG failure has been declared but recovered, the terminal may transmit an MCG failure information message to split SRB1 or SRB3.

In another embodiment, the operation in which an SCG failure has already been declared and not recovered may be replaced depending on whether transmission or reception to or from the SCG has been suspended.

When the SCG transmission/reception of the SRB and the DRB is suspended at the time of MCG failure, the terminal performs an RRC reestablishment procedure.

When the SCG transmission/reception of the SRB and the DRB is not suspended at the time of MCG failure, the terminal may transmit an MCG failure information message to split SRB1 or SRB3.

When the MCG failure report message has not been transmitted after the MCG failure, or when an SCG failure occurs although an RRC message for solving the corresponding problem has not been received from the base station after the MCG failure report message (SCG transmission or reception is suspended), the terminal performs an RRC reestablishment procedure.

When it is necessary for the terminal to perform the RRC reestablishment procedure, the terminal may cancel transmission of a previously triggered MCG failure information message or SCG failure information message.

Figure 34:
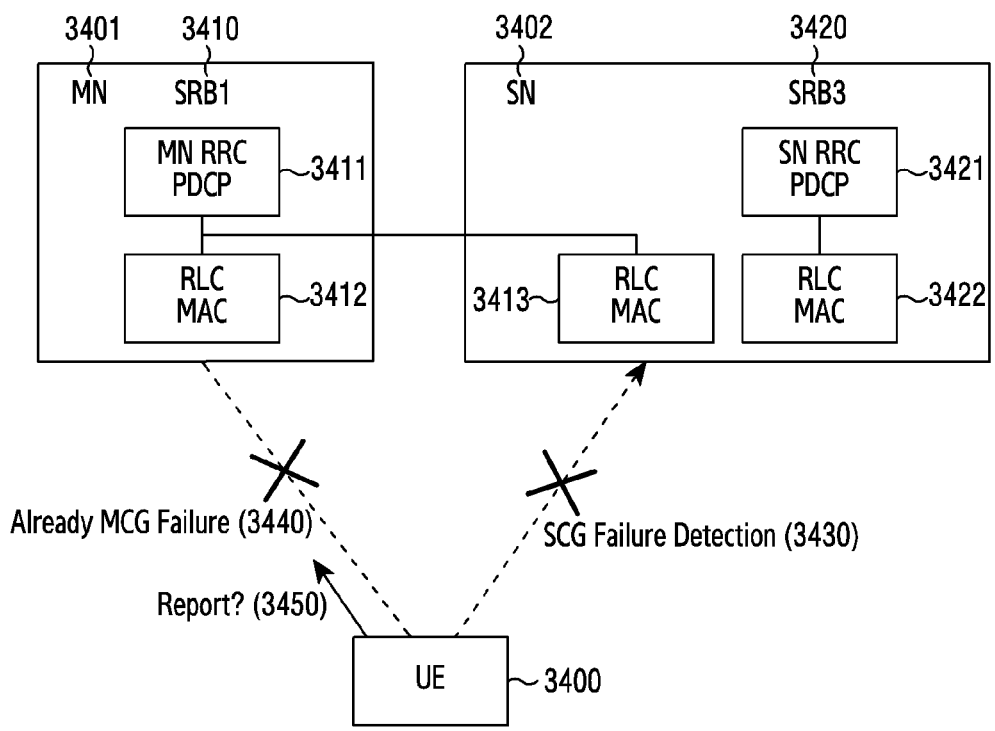
FIG. 34 illustrates another collision scenario of an MCG failure and an SCG failure.

FIG. 34 illustrates another collision scenario of an MCG failure and an SCG failure. As described above with reference to FIGS. 3 and 30, when an SCG failure occurs (3430), the terminal 3400 may transmit an SCG failure information message to the base station using SRB1 connected to the MCG. However, when an SCG failure is sensed but an MCG failure has already occurred and the MCG failure operation described with reference to FIG. 29 is in progress (3440), the SCG failure report message cannot be transmitted to an MCG link. In addition, when an MCG failure was not sensed at the time when an SCG failure report was sensed (3430) but an SCG report message has not been transmitted, or even if an MCG failure is sensed lately in the case in which an SCG report message was transmitted but an RRC message was not received from the base station by SRB1, a recovery procedure based on the SCG failure report cannot be performed normally. Accordingly, in such a case, SCG failure information cannot be reported (3450). Accordingly, in this embodiment, it can be necessary for the terminal to perform an RRC reestablishment procedure, and the terminal may cancel transmission of a previously triggered MCG failure information message or SCG failure information message.

SRB1 3410 and SRB2 3410 are configured between the master node 3401 and the terminal, and SRB3 3420 is configured between the secondary node 3402 and the terminal. In this case, for SRB1 3410 and SRB2 3410, RRC and PDCP may be located in the master node (3411), and RLC and MAC may exist in the master node and the secondary node, respectively (3412, 3413). In this case, when the RLC is located only in the MCG, the SRB is referred to as a non-split SRB, and when the RLC is located in the MCG and the SCG, the SRB is referred to as a split SRB3. That is, SRB1 may be referred to as split SRB1. In contrast, for SRB3, RRC and PDCP are located at the secondary node (3421), and RLC and MAC are also located at the secondary node (3422).

Specific operations performed when an SCG failure occurs in the embodiment of FIG. 34 are as follows.

When an MCG failure has already been declared at the time of SCG failure and the SCG failure has not been recovered (when an MCG failure information message has not been transmitted or when an RRC message has not been received from the base station after the transmission), the terminal performs an RRC reestablishment procedure. In this case, what the MCG failure has already been recovered after the declaration of the MCG failure, the MCG failure is not considered to have been declared.

When an MCG failure has not been declared at the time of SCG failure, or when the MCG failure has been declared but recovered, the terminal may transmit an SCG failure information message to split SRB1.

In another embodiment, the operation in which an MCG failure has already been declared and not recovered may be replaced depending on whether transmission or reception to or from the MCG has been suspended. Accordingly, When the MCG transmission/reception of the SRB and the DRB is suspended at the time of SCG failure, the terminal performs an RRC reestablishment procedure.

When the MCG transmission/reception of the SRB and the DRB is not suspended at the time of SCG failure, the terminal may transmit an SCG failure information message to SRB1.

When the SCG failure report message has not been transmitted after the SCG failure, or when an MCG failure occurs although an RRC message for solving the corresponding problem has not been received from the base station after the SCG failure report message (MCG transmission or reception is suspended), the terminal performs an RRC reestablishment procedure.

When it is necessary for the terminal to perform the RRC reestablishment procedure, the terminal may cancel transmission of a previously triggered MCG failure information message or SCG failure information message.

Figure 35:
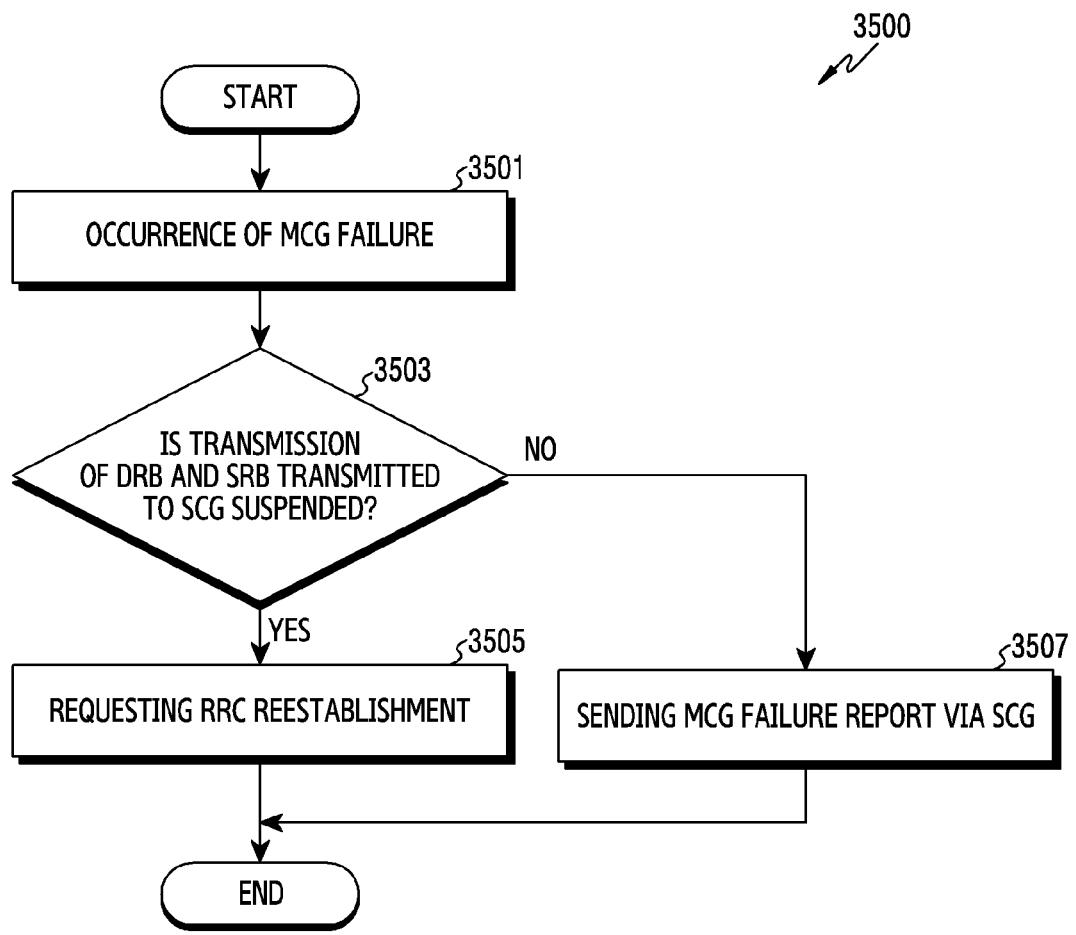
FIG. 35 illustrates a detailed operation process of a terminal when an MCG failure occurs.

FIG. 35 illustrates a detailed operation process 3500 of a terminal when an MCG failure occurs. An MCG failure in a terminal may occur by at least one of the following processes.

MCG radio link failure (RLF)
Failure of reconfiguration with synchronization
Integrity check failure of SRB1/2
RRC reconfiguration failure Here, an MCG RLF may occur by at least one of the following processes.

Expiration of T310 Timer
Random access problem
Reaching maximum number of retransmissions of RLC When an MCG failure occurs by at least one of the above processes (3501), the terminal may check whether SRB and DRB transmission to the SCG is suspended (3503). When the transmission of the DRB and the SRB transmitted to the SCG is suspended, the terminal may perform an RRC reestablishment procedure (3505). In this case, an MCG failure information message and an SCG failure information message, which have already triggered, may be canceled. Otherwise, when the transmission of the DRB and the SRB transmitted to the SCG is not suspended, the terminal may send the MCG failure information message via the SCG through an MCG failure report procedure (3507). The radio bearer used in this case may be split SRB1 or SRB3.

Figure 36:
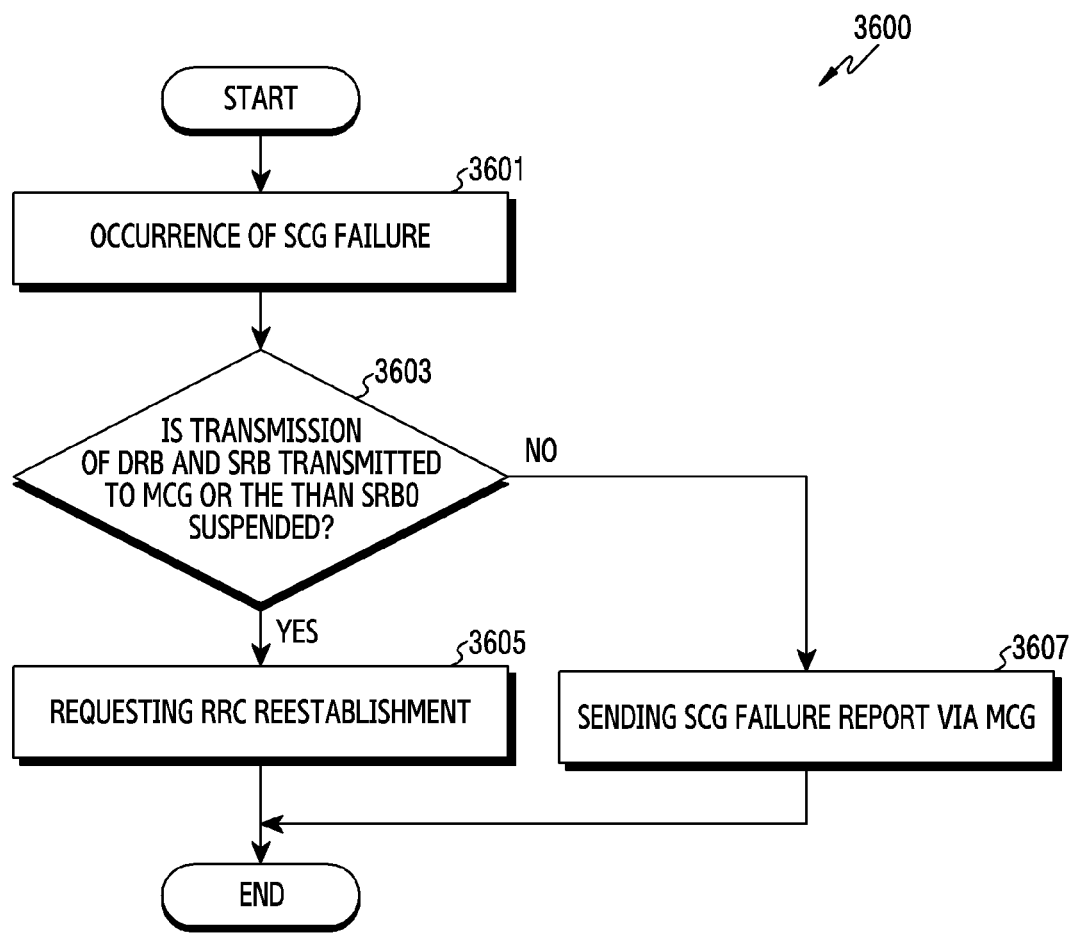
FIG. 36 illustrates a detailed operation process of a terminal when an SCG failure occurs.

FIG. 36 illustrates a detailed operation process 3600 of a terminal when an SCG failure occurs. An SCG failure in a terminal may occur by at least one of the following processes.

SCG radio link failure (RLF)
Failure of SCG reconfiguration with synchronization
SCG change failure
Integrity check failure of SRB3

Here, an SCG RLF may occur by at least one of the following processes.
Expiration of T313 Timer
Random access problem of SCG
Reaching maximum number of retransmissions of SCG RLC When an SCG failure occurs by at least one of the above processes (3601), the terminal may check whether SRB and DRB transmission to the MCG other than SRB0 is suspended (3603). When the transmission of the DRB and the SRB transmitted to the MCG other than SRB0 is suspended, the terminal may perform an RRC reestablishment procedure (3605). In this case, an MCG failure information message and an SCG failure information message, which have already triggered, may be canceled. Otherwise, when the transmission of the DRB and the SRB transmitted to the MCG is not suspended, the terminal may send the SCG failure information message via the MCG through an SCG failure report procedure (3607). The radio bearer used in this case may be SRB1.

Figure 37:
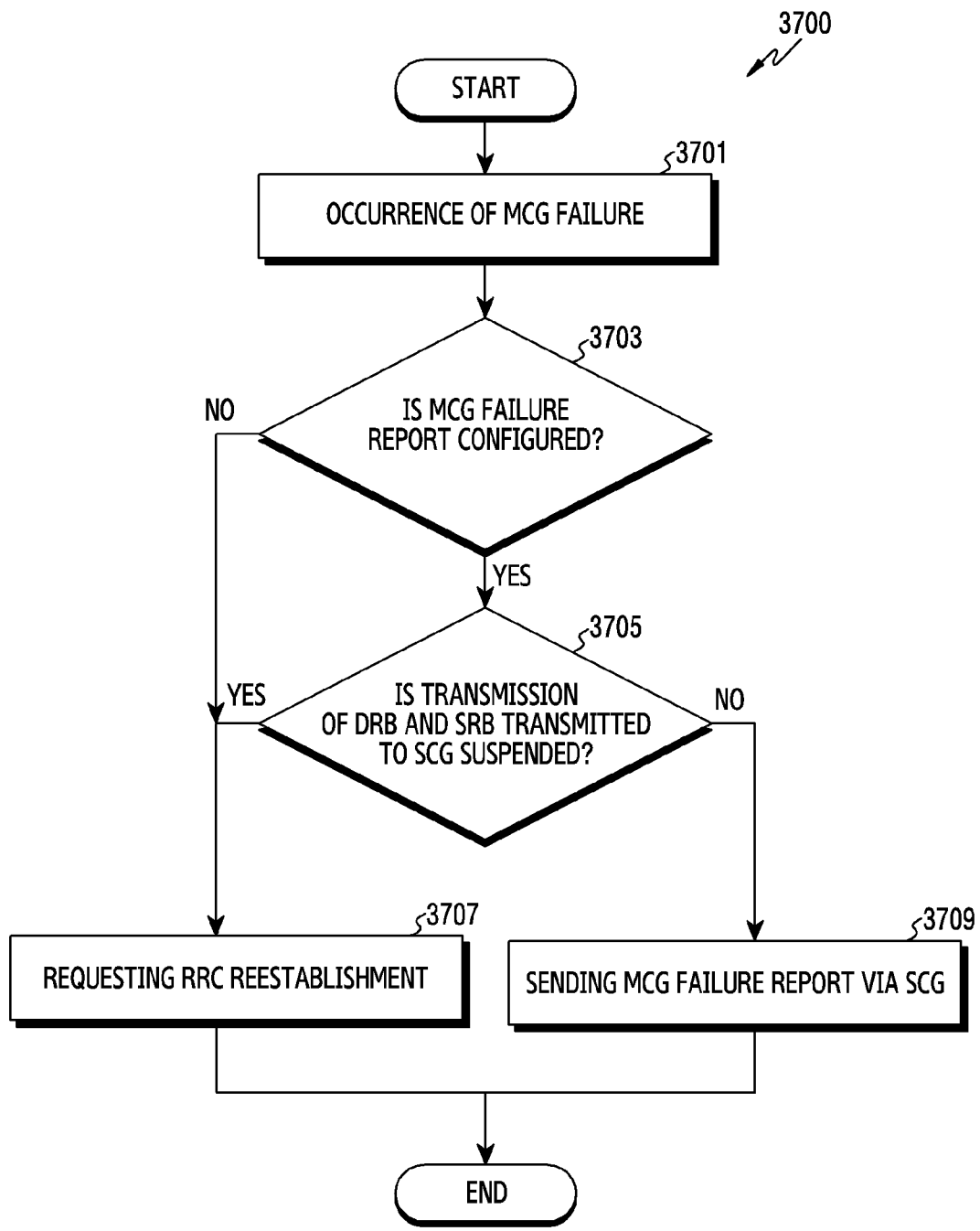
FIG. 37 illustrates a detailed operation process of a terminal when an MCG failure occurs.

FIG. 37 illustrates a detailed operation process 3700 of a terminal when an failure occurs. An MCG failure in a terminal may occur by at least one of the following processes.
MCG radio link failure (RLF)
Failure of reconfiguration with synchronization
integrity check failure of SRB1/2
RRC reconfiguration failure Here, an MCG failure may occur by at least one of the following processes.
Expiration of T310 Timer
Random access problem
Reaching maximum number of retransmissions of RLC When an MCG failure occurs by at least one of the above processes (3701), the operation of the terminal ma vary depending on whether a terminal is configured to perform the MCG failure report procedure. A base station may allow terminals connected thereto to perform the same operation, but may allow respective terminals to perform different procedures according to an embodiment. For example, each terminal be equally configured to transmit or not to transmit an MCG failure information message. In this case, each terminal may be, or may not be configured to transmit or not to transmit an MCG failure information message through an RRC configuration message. In another embodiment, each terminal may be configured to transmit or not to transmit an MCG failure information message to system information. When each terminal is not configured to perform the MCG failure report operation (3703: No), the terminal performs an RRC reestablishment procedure when the MCG failure occurs (3707).

When each terminal is configured to perform the MCG failure report operation (3703: Yes), the terminal may check whether SRB and DRB transmission to the SCG is suspended (3705). When the transmission of the DRB and the SRB transmitted to the SCG is suspended, the terminal may perform an RRC reestablishment procedure (3707). In this case, an MCG failure information message and an SCG failure information message, which have already triggered, may be canceled. Otherwise, when the transmission of the DRB and the SRB transmitted to the SCG is not suspended, the terminal may send the MCG failure information message via the SCG through an MCG failure report procedure (3709). The radio bearer used in this case may be split SRB1 or SRB3.

Figure 38:
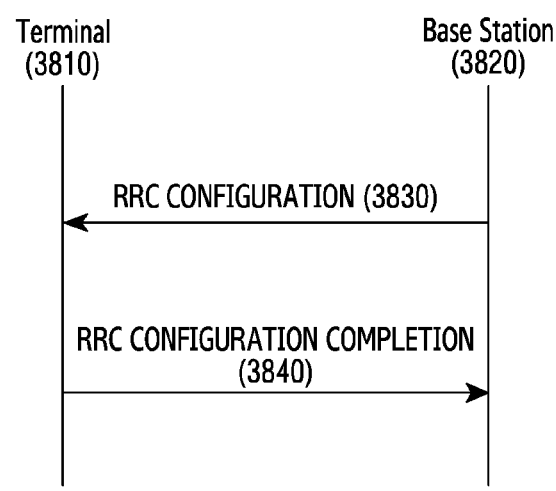
FIG. 38 illustrates a method of configuring an MCG failure information message transmission procedure and an MCG failure report message transmission procedure.

FIG. 38 illustrates a method of configuring an MCG failure information message transmission procedure and an MCG failure report message transmission procedure. When an MCG failure occurs in a terminal 3810, the operation of the terminal may vary depending on whether the terminal is configured to perform an MCG failure report procedure. A base station 3820 may allow terminals connected thereto to perform the same operation, but may allow respective terminals to perform different procedures according to an embodiment. For example, each terminal may be equally configured to transmit or not to transmit an MCG failure information message. In this case, each terminal may be configured to transmit or not to transmit an MCG failure information message through an RRC configuration message (3830). The message may be transmitted in the state of being included in an RRC establishment message or an RRC reestablishment message instead of an RRC configuration message. When the terminal receives the configuration message, the terminal may complete the received configuration and then transmit a configuration completion message to the base station (3840). In the embodiment of FIG. 38, a method of notifying whether an MCG failure information procedure is configured based on an RRC message has been described. However, in another embodiment, a terminal may be configured to transmit or not to transmit an MCG failure information message to system information. When the terminal is not configured to perform the MCG failure report operation, the terminal performs an RRC reestablishment procedure when the MCG failure occurs.

As described above with reference to FIG. 38, information on a configuration for an MCG failure report may be transmitted through an RRC message. According to an embodiment, the information on the configuration for the MCG failure report may include the following information.

According to an embodiment, an RRC configuration message 3830 may include an indicator indicating whether the terminal performs the MCG failure report procedure or the RRC reestablishment procedure.

When the terminal is configured to perform the MCG failure report procedure, the MCG RLF report message may be transmitted to an RLC device connected to an SCG when the triggering of an RLF for the MCG described in another embodiment is detected. In this case, when split SRB1 is configured, the MCG RLF report message may be transmitted to split SRB1. When SRB1 is not configured and SRB3 is configured, the MCG RLF report message may be transmitted to SRB3. When both of split SRB1 and SRB3 are not configured, it is impossible to perform the MCG RLF report. Thus, the terminal may declare an RRC configuration failure without sending an RRC configuration completion message 3840. According to another embodiment, if both of split SRB1 and SRB3 are not configured, the terminal may request RRC reestablishment from the base station.

When the terminal is configured not to perform the MCG failure report procedure, that is, when the terminal is configured to perform the RRC reestablishment procedure, the terminal may request RRC reestablishment from the base station when the terminal detects the triggering of the RLF for the MCG.

Figure 39:
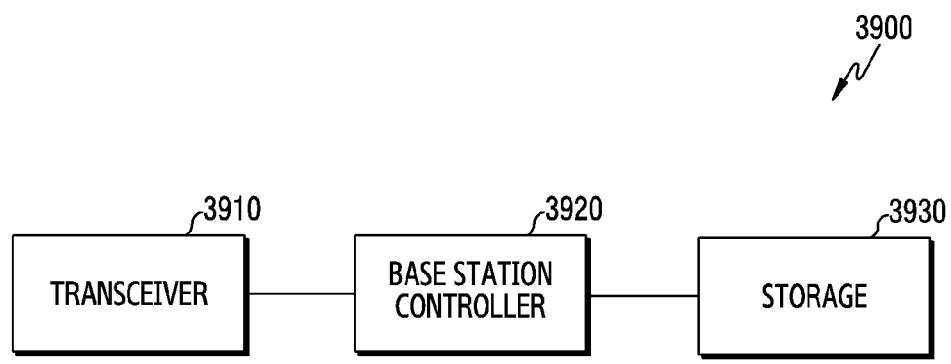
FIG. 39 illustrates the configuration of a base station in a wireless communication system according various embodiments.

FIG. 39 illustrates the configuration of a base station in a wireless communication system according various embodiments. Terms such as "-part" and "-unit" to be used below means a unit for processing at least one function or operation, and may be implemented by hardware, software, or a combination of hardware and software.

Referring to FIG. 39, a base station 3900 may include a transceiver 3910, a base station controller 3920, and a storage 3930. In various embodiments, the base station controller 3920 may also be referred to as a circuit, an application-specific integrated circuit, or at least one processor.

The transceiver 3910 may transmit/receive signals from/to other network entities. The transceiver 3910 may transmit system information to, for example, a terminal, and may transmit a synchronization signal or a reference signal.

The base station controller 3920 may control the overall operation of the base station according to various embodiments. For example, the base station controller 3920 may control the base station to perform the above-described operations of the base station.

The storage 3930 may store least one of information transmitted/received via the transceiver 3910 and information generated via the base station controller 3920.

In various embodiments, the base station 3900 may be the same as the base station 110, or may be included in the base station 110. In this case, the transceiver 3910 may be included in the wireless communication unit 210 and/or the backhaul communication unit 220, the base station controller 3920 may be included in the controller 240, and the storage 3930 may be included in the storage 230.

Figure 40:
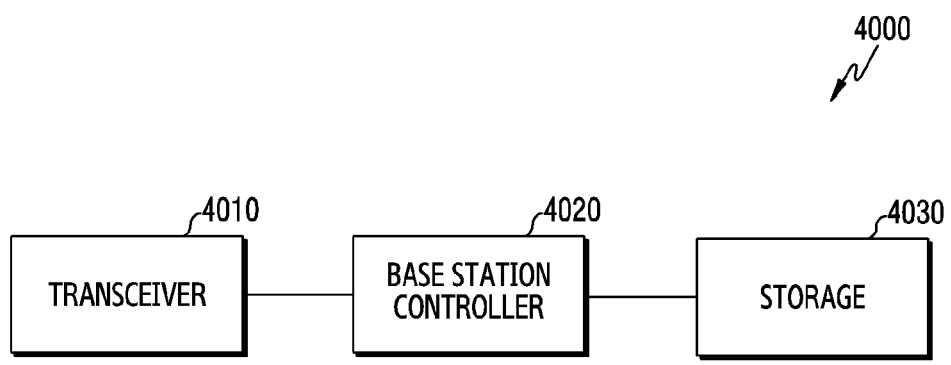
FIG. 40 illustrates the configuration of a terminal in a wireless communication system according various embodiments.

FIG. 40 illustrates the configuration of a terminal in a wireless communication system according various embodiments. Terms such as "-part" and "-unit" to be used below means a unit for processing at least one function or operation, and may be implemented by hardware, software, or a combination of hardware and software.

Referring to FIG. 40, a terminal 4000 may include a transceiver 4010, a terminal controller 4020, and a storage 4030. According to various embodiments, the terminal controller 4020 may also be referred to as a circuit, an application-specific integrated circuit, or at least one processor.

The transceiver 4010 may transmit/receive signals from/to other network entities. The transceiver 4010 may receive system information from, for example, a base station, and may receive a synchronization signal or a reference signal.

The terminal controller 4020 may control the overall operation of the terminal according to various embodiments. For example, the terminal controller 4020 may control the terminal to perform the above-described operations of the terminal.

The storage 4030 may store at least one of information transmitted/received via the transceiver 4010 and information generated via the terminal controller 4020.

In various embodiments, the terminal 4000 may be the same as the terminal 120 or the terminal 130, or may be included in the terminal 120 or the terminal 130. In this case, the transceiver 4010 may be included in the communication unit 310, the controller 4020 may be included in the controller 330, and the storage 4030 may be included in the storage 320.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) configured with a master cell group (MCG) and a secondary cell group (SCG) in a wireless communication system, the method comprising:
 detecting a radio link failure (RLF) of the MCG;
 identifying whether an SCG transmission is suspended;
 in case that the SCG transmission is suspended:
  performing a connection re-establishment procedure; and
 in case that the SCG transmission is not suspended:
  suspending an MCG transmission for all signaling radio bearers (SRBs) and data radio bearers (DRBs) except SRB0, based on the detected RLF of the MCG;
  resetting an MCG medium access control (MAC), based on the detected RLF of the MCG;
  in case that a split SRB1 is configured for the UE, transmitting, to a secondary base station associated with the SCG via the split SRB1, information on the RLF of the MCG; and in case that an SRB3 is configured for the UE, transmitting, to the secondary base station associated with the SCG via the SRB3, the information on the RLF of the MCG.

2. The method of claim 1, wherein the RLF of the MCG is detected based on an expiry of a T310 timer, a random access problem indication, or a maximum number of retransmission of radio link control (RLC) being reached.

3. The method of claim 1, further comprising:
in case that the SCG transmission is not suspended and the split SRB1 is configured for the UE, setting a primary path to the SCG.

4. A user equipment (UE) configured with a master cell group (MCG) and a secondary cell group (SCG) in a wireless communication system, the UE comprising:
a transceiver; and
at least one processor coupled with the transceiver and configured to:
detect a radio link failure (RLF) of the MCG,
identify whether an SCG transmission is suspended,
in case that the_SCG transmission is suspended:
perform a connection re-establishment procedure, and
in case that the SCG transmission is not suspended:
suspend an MCG transmission for all signaling radio bearers (SRBs) and data radio bearers (DRBs) except SRB0, based on the detected RLF of the MCG;
reset an MCG medium access control (MAC), based on the detected RLF of the MCG;
in case that a split SRB1 is configured for the UE, transmit, to a secondary base station associated with the SCG via the split SRB1, information on the RLF of the MCG; and
in case that an SRB3 is configured for the UE, transmit, to the secondary base station associated with the SCG via the SRB3, the information on the RLF of the MCG.

5. The UE of claim 4, wherein the RLF of the MCG is detected based on an expiry of a T310 timer, a random access problem indication, or a maximum number of retransmission of radio link control (RLC) being reached.

6. The UE of claim 4, wherein the at least one processor is further configured to:
in case that the SCG transmission is not suspended and the split SRB1 is configured for the UE, set a primary path to the SCG.

* * * * *